(12) United States Patent
Wang et al.

(10) Patent No.: US 11,569,278 B1
(45) Date of Patent: Jan. 31, 2023

(54) SYSTEMS AND METHODS FOR CALLABLE OPTIONS VALUES DETERMINATION USING DEEP MACHINE LEARNING

(71) Applicant: Wells Fargo Bank, N.A., San Francisco, CA (US)

(72) Inventors: Haojie Wang, San Francisco, CA (US); Han Chen, San Francisco, CA (US); Agus Sudjianto, San Francisco, CA (US); Richard Liu, San Francisco, CA (US); Qi Shen, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/378,367

(22) Filed: Jul. 16, 2021

Related U.S. Application Data

(63) Continuation of application No. 16/506,155, filed on Jul. 9, 2019, now Pat. No. 11,100,586.

(51) Int. Cl.
*G06N 20/00* (2019.01)
*G06F 17/18* (2006.01)
(Continued)

(52) U.S. Cl.
CPC .......... *H01L 27/1461* (2013.01); *G06T 7/55* (2017.01); *H01L 27/1463* (2013.01);
(Continued)

(58) Field of Classification Search
CPC ...... G06Q 40/06; G06F 17/18; G06N 3/0472; G06N 3/08; G06N 20/00; G06N 3/0454; G06N 3/084
(Continued)

(56) References Cited

U.S. PATENT DOCUMENTS 8,357,956 B2   1/2013   Kobayashi et al.
8,697,477 B2   4/2014   Ha et al.
(Continued)

FOREIGN PATENT DOCUMENTS

JP   2010-192483 A   9/2010
JP   2011-253962 A   12/2011
(Continued)

OTHER PUBLICATIONS

U.S. Appl. No. 16/506,111, filed Jul. 9, 2019, U.S. Pat. No. 10,818,708.
(Continued)

*Primary Examiner* — Susan E. Torgerson
(74) *Attorney, Agent, or Firm* — Womble Bond Dickinson (US) LLP

(57) ABSTRACT

Systems, apparatuses, methods, and computer program products are disclosed for pricing a callable instrument. A plurality of corresponding pairs of Brownian motion paths and index value paths are determined corresponding to a set of dates. A deep neural network (DNN) of a backward DNN solver is trained until a convergence requirement is satisfied by for each pair of corresponding Brownian motion path and index value path, using the backward DNN solver to determine by iterating in reverse time order from a final discounted option payoff to an initial value. A statistical measure of spread of a set of initial values is determined and parameters of the DNN are modified based on the statistical measures of spread. Pricing information is determined by the backward DNN solver and provided such that a representation thereof is provided via an interactive user interface of a user computing device.

20 Claims, 7 Drawing Sheets

(51) Int. Cl.
  *G06N 3/02* (2006.01)
  *G06Q 40/06* (2012.01)
  *H01L 27/146* (2006.01)
  *G06T 7/55* (2017.01)
  *H04N 5/359* (2011.01)

(52) U.S. Cl.
  CPC ....... *H01L 27/14643* (2013.01); *H04N 5/359* (2013.01); *G06T 2207/30252* (2013.01)

(58) Field of Classification Search
  USPC .......................................................... 705/36
  See application file for complete search history.

(56) References Cited

U.S. PATENT DOCUMENTS

| | | | |
|---|---|---|---|
| 8,710,559 | B2 | 4/2014 | Kobayashi et al. |
| 8,716,719 | B2 | 5/2014 | Matsumura et al. |
| 8,921,900 | B2 | 12/2014 | Iida et al. |
| 9,124,833 | B2 | 9/2015 | Toyoguchi et al. |
| 9,231,007 | B2 | 1/2016 | Hynecek |
| 9,548,328 | B2 | 1/2017 | Hasegawa et al. |
| 10,381,388 | B2 | 8/2019 | Toyoguchi |
| 2006/0259381 | A1 | 11/2006 | Gershon |
| 2010/0207231 | A1 | 8/2010 | Iwamoto et al. |
| 2011/0241079 | A1 | 10/2011 | Oike et al. |
| 2011/0298022 | A1 | 12/2011 | Ha et al. |
| 2018/0114811 | A1 | 4/2018 | Sato et al. |
| 2018/0184027 | A1 | 6/2018 | Shinohara |
| 2018/0260902 | A1 | 9/2018 | Curran |
| 2018/0350864 | A1 | 12/2018 | Toyoguchi |
| 2018/0374886 | A1 | 12/2018 | Iwata et al. |

FOREIGN PATENT DOCUMENTS

| | | |
|---|---|---|
| JP | 2013-041875 A | 2/2013 |
| JP | 2014-165286 A | 9/2014 |
| JP | 2018-107409 A | 7/2018 |

OTHER PUBLICATIONS

Andersen, Leif. A Simple Approach to the Pricing of Bermudan Swaptions in the Multifactor LIBOR Market Model, Working Paper, Gen Re Financial Products, Mar. 5, 1999, pp. 1-26. [Retrieved from the Internet Aug. 8, 2019] <https://ssrn.com/abstract-155208>.
Arulkumaran, Kai, et al. A Brief Survey of Deep Reinforcement, IEEE Signal Processing Magazine, Special Issue On Deep Learning For Image Understanding (arXiv:1708.05866v2), Sep. 28, 2017, (16pages).
Beylkin, Gregory, et al. Algorithms For Numerical Analysis In High Dimensions, SIAM Journal On Scientific Computing, Society For Industrial and Applied Mathematics, (2005), vol. 26, No. 6, pp. 2133-2159. DOI: 10.1137/040604959.
Brace, Alan, et al. The Market Model of Interest Rate Dynamics, Mathematical Finance, Apr. 1997, vol. 7, No. 2, pp. 127-155.
Broadie, Mark, et al. A Stochastic Mesh Method for Pricing High Dimensional American Options, Working Paper, Columbia University, New York, 1997. Journal of Computational Finance, vol. 7, No. 4, pp. 35-72.
Goodfellow, Ian., et al. Deep Learning, MIT Press, (2016), 798 pages. [Retrieved from the Internet Aug. 8, 2019] <http://www.deeplearningbook.org>.
Han, Jiequn et al. Overcoming The Curse Of Dimensionality: Solving High-Dimensional Partial Differential Equations Using Deep Learning, Jul. 9, 2017, 14 pages. [Retrieved from the Internet Aug. 8, 2019] <https://arxiv.org/abs/1707.02568>.
Han, Jiequn, Arnulf Jentzen, and E. Weinan. "Overcoming the curse of dimensionality: Solving high-dimensional partial differential equations using deep learning." (2017): 1-13 (Year: 2017).
Heath, David et al. Bond Pricing and the Term Structure of Interest Rates: A New Methodology, Econometrica: Journal of the Econometric Society, Jan. 1992, vol. 60, No. 1, Jan. 1992, pp. 77-105. DOI: 10.2307/2951677.
Henry-Labordere, Pierre. "Deep primal-dual algorithm for BSDEs: Applications of machine learning to CVAand IM." (2017). (Year:2017).
Hinton, Geoffrey E., et al. Deep Neural Networks For Acoustic Modeling In Speech Recognition. IEEE Signal Processing Magazine, vol. 29, Nov. 2012, pp. 82-97. [Retrieved from the Internet Aug. 8, 2019] <https://www.microsoft.com/en-us/research/publication/deep-neural-networks-for-acoustic-modeling-in-speech-recognition/>.
Jiequn, Weinan E. et al. Deep Learning-Based Numerical Methods For High-Dimensional Parabolic Partial Differential Equations And Backward Stochastic Differential Equations, Communications In Mathematics and Statistics, (2017), 5: 349, 39 pages.
Karoui, N. El et al. Backward Stochastic Differential Equations In Finance, Mathematical Finance, vol. 7, No. 1, Jan. 1997, pp. 1-71.
Krizhevsky, Alex, et al. ImageNet Classification With Deep Convolutional Neural Networks. Advances in Neural Information Processing Systems (2012), pp. 1097-1105. [Retrieved from the Internet Aug. 8, 2019] <http://papers.nips.cc/paper/4824-imagenet-classification-with-deep-convolutional-neural-network>.
LeCun, Yann, et al. Deep learning. Nature, vol. 521. May 28, 2015, pp. 436-444. [Retrieved from the Internet Aug. 8, 2019] <https://creativecoding.soe.ucsc.edu/courses/cs523/slides/week3/DeepLearning_LeC_un.pdf> DOI: 10.1038/nature14539.
Longstaff, Francis et al. Valuing American Options by Simulation: A Simple Least-Squares Approach, The Review of Financial Studies, vol. 14, Issue 1, Jan. 1, 2001, pp. 113-147.
Lopez-Salas, Jose G., et al. PDE Formulation Of Some SABR/LIBOR Market Models And Its Numerical Solution With A Sparse Grid Combination Technique, Computers and Mathematics with Applications, Mar. 1, 2018, vol. 75, Issue 5, pp. 1616-1634.
Pardoux, Etienne. et al. Adapted Solution Of A Backward Stochastic Differential Equation, Systems & Control Letters vol. 14, No. 1, Jan. 1990, pp. 55-61.
Raissi, Maziar. "Forward-backward stochastic neural networks: Deep learning of high-dimensional partial differential equations."(2018). (Year: 2018).
Rumelhart, David E., et al. Learning Representations By Back-Propagating Errors. Nature, vol. 323, Oct. 9, 1986, pp. 533-536.
She, Jian-Huang, and Dan Grecu. "Neural network for CVA: Learning future values." (2018) (Year: 2018).
Yu, Bing, Xiaojing Xing, and Agus Sudjianto. "Deep-learning based numerical BSDE method for barrier options." arXiv preprint arXiv: 1904.05921 (2019). (Year: 2019).

CALLABLE INSTRUMENT PRICING REQUEST FORM

Origination Date:
Maturity Date:
Index:
Pay Off Terms:
Discounted Option Terms:

SUBMIT

FIG. 6

SYSTEMS AND METHODS FOR CALLABLE OPTIONS VALUES DETERMINATION USING DEEP MACHINE LEARNING

CROSS-REFERENCE TO RELATED APPLICATIONS

This application is a continuation of U.S. application Ser. No. 16/506,155, filed Jul. 9, 2019, the content of which is incorporated by reference herein in its entirety.

TECHNOLOGICAL FIELD

Example embodiments of the present disclosure relate generally to the use of deep machine learning in determining the value of callable instruments and, more particularly, to systems and methods for providing the value of callable instruments in real time or near real time.

BACKGROUND

A callable instrument is an instrument (e.g., derivative, bond, security, and/or the like) where the issuer retains the right to redeem the instrument prior to the stated maturity date. Traditional methods for determining the value of a callable instrument at a particular point in time include numerical methods, which are only capable of handling low dimensional problems, and Monte Carlo methods, which are computationally expensive.

BRIEF SUMMARY

A callable instrument is an instrument where the issuer retains the right to redeem or call the instrument prior to the stated maturity date. Determining the value of various callable instruments is not straightforward. For example, for a callable instrument having multiple exercise dates (e.g., dates on which the instrument may be redeemed or called), determining the value of the callable instrument at a particular time (e.g., an exercise date) includes determining both the continuation value of the callable option and the payoff value of the callable instrument at the particular time. Traditional methods for determining the value of callable instruments include numerical methods, which are only capable of handling low dimensional problems, and Monte Carlo methods, which are computationally expensive. For example, when using Monte Carlo methods using a system having a reasonable amount of processing power and processing speed, the computation takes a significant amount of time. However, in situations where a decision regarding holding or calling a callable instrument must be made in a relatively short period of time, traditional methods for determining callable options values may be too slow for effective use.

Various embodiments provide methods, systems, apparatuses, and/or computer program products for the efficient determination of the value of callable instruments at one or more points in time. For example, various embodiments provide methods, systems, apparatuses, and/or computer program products for determining the value of callable instruments, possibly for multiple callable instruments, at a plurality of points in time (e.g., exercise dates of the callable instruments). Various embodiments are configured to determine and provide the value of callable instruments for one or more callable instruments at one or more points in time in real time or near real time with respect to receiving a corresponding request. Various embodiments provide an interactive user interface (IUI) through which a user may cause a request for value determination to be provided and through which a user may be provided a graphical and/or tabular representation of callable options values for one or more callable options at one or more points in time.

In various embodiments, the value of the callable instrument(s) are determined using a backward deep neural network (DNN) solver. In various embodiments, the problem for determining the value of the callable instrument(s) may be posed as a partial differential equation (PDE) and/or an equivalent backward stochastic differential equation (BSDE). In various embodiments, the value of the callable instrument(s) depends on an index (e.g., the Libor index and/or the like). The PDE and/or BSDE may be configured to describe the evolution of the value of the callable instrument with respect to the index. In various embodiments, the backward DNN solver, through machine learning, is trained to describe the sensitivity of the value of the callable instrument to changes in the corresponding index. For example, the backward DNN solver may use the sensitivity of the value of the callable instrument to changes in the corresponding index at various points in time to determine the value of the callable instrument at various points in time. In various embodiments, the DNN of the backward DNN solver comprises a plurality of sub-nets, with each sub-net corresponding to a time step of a time array (e.g., one of the multiple exercise dates). Each of the sub-nets are trained simultaneously such that the value of callable instrument at multiple points in time are determined through one training of the backward DNN solver.

In various embodiments, a training iteration of the backward DNN solver comprises determining a final value of the callable instrument at a final time in a time array and projecting the value of the callable instrument backward (possibly based on an index), through one or more intermediate values corresponding to one or more intermediate times of the time array, back to an initial value of the callable instrument corresponding to an initial time of the time array. This backward projection is performed along a plurality of paths (e.g., Monte Carlo paths) and a set of initial values of the callable instrument are determined therefrom. A statistical measure of spread (e.g., variance, standard deviation, and/or the like) for the set of initial values is determined and the weights and/or parameters of the backward DNN solver are modified to reduce the statistical measure of spread for the set of initial values determined on the next training iteration of backward projection for the plurality of paths. Once the backward DNN solver satisfies a convergence requirement (e.g., the statistical measure of spread is sufficiently small and/or the number of training iterations has reached a particular number) the resulting values of the callable instrument at the various points in time are provided (e.g., for display to a user via a user computing device, stored in memory for later use, and/or the like). This backward projection of the value of the callable instrument provides the basis of the name backward DNN solver. In various embodiments, the DNN of the backward DNN solver comprises a feedforward DNN. For example, the information within the backward DNN solver moves from the input nodes, through the hidden nodes, and out to the output nodes without forming any cycles or loops within the network.

According to a first aspect, a method for pricing a callable instrument is provided. In an example embodiment, the method comprises defining a set of dates comprising a plurality of time-ordered dates. One or more dates of the set of dates are exercise dates of the callable instrument. The method further comprises determining a plurality of corresponding pairs of Brownian motion paths and index value paths, each path corresponding to the set of dates; and training a deep neural network (DNN) of a backward DNN solver until a convergence requirement is satisfied by, for each pair of corresponding Brownian motion path and index value path, using the backward DNN solver, determining a discounted option payoff for each of the plurality of dates of the set of dates, wherein for each pair of corresponding Brownian motion path and index value path, (a) a final discounted option payoff, corresponding to a final date of the set of dates, is determined, (b) intermediate discounted payoff options, corresponding to the dates of the set of dates between an initial date and the final date of the set of dates, are determined in reverse time order, and (c) an initial value, corresponding to the initial date of the set of dates, is determined, defining a set of initial values comprising the initial value determined for each pair of corresponding Brownian motion path and index value path and determining one or more statistical measures of spread based on the set of initial values, and modifying one or more parameters of the DNN based on the one or more statistical measures of spread. The method further comprises, after the convergence requirement is satisfied, determining pricing information for the callable instrument; and providing at least a portion of the pricing information such that a user computing device receives the at least a portion of the pricing information and provides a representation of the at least a portion of the pricing information via an interactive user interface provided via a display of the user computing device.

According to another aspect, an apparatus for pricing callable options is provided. In an example embodiment, the apparatus comprises processing circuitry (e.g., one or more processors, solver circuitry, and/or DNN circuitry). In an example embodiment, the processing circuitry is configured to define a set of dates comprising a plurality of time-ordered dates, one or more dates of the set of dates being an exercise date of the callable instrument; determine a plurality of corresponding pairs of Brownian motion paths and index value paths, each path corresponding to the set of dates. The processing circuitry is further configured to train a deep neural network (DNN) of a backward DNN solver until a convergence requirement is satisfied by, for each pair of corresponding Brownian motion path and index value path, using the backward DNN solver, determining a discounted option payoff for each of the plurality of dates of the set of dates, wherein for each pair of corresponding Brownian motion path and index value path, (a) a final discounted option payoff, corresponding to a final date of the set of dates, is determined, (b) intermediate discounted payoff options, corresponding to the dates of the set of dates between an initial date and the final date of the set of dates, are determined in reverse time order, and (c) an initial value, corresponding to the initial date of the set of dates, is determined; defining a set of initial values comprising the initial value determined for each pair of corresponding Brownian motion path and index value path and determining one or more statistical measures of spread based on the set of initial values; and modifying one or more parameters of the DNN based on the one or more statistical measures of spread. The processor circuitry is further configured to, after the convergence requirement is satisfied, determine pricing information for the callable instrument. The apparatus further comprises communication interface circuitry configured to provide at least a portion of the pricing information such that a user computing device receives the at least a portion of the pricing information and provides a representation of the at least a portion of the pricing information via an interactive user interface provided via a display of the user computing device.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

FIG. 6 illustrates an example IUI that may be used to cause the generation of a callable options values request, in an example embodiment described herein.

DETAILED DESCRIPTION

Figure 1:
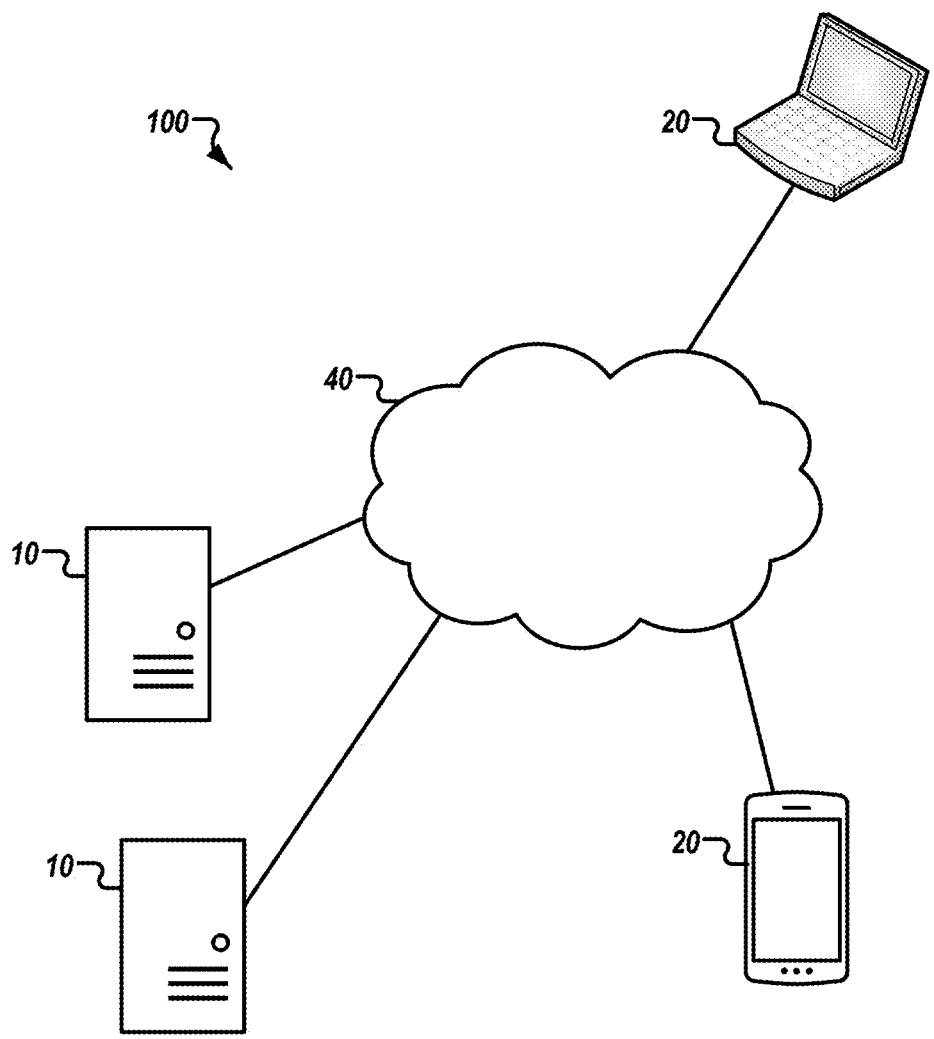
FIG. 1 is a block diagram showing an example architecture of one embodiment described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Where the specification states that a particular component or feature "may," "can," "could," "should," "would," "preferably," "possibly," "typically," "optionally," "for example," "often," "exemplary," or "might" (or other such language) be included or have a characteristic, that particular component or feature is not required to be included or to have the characteristic. Such terminology is intended to convey that the particular component or feature is included in some embodiments while excluded in others, or has the characteristic in some embodiments while lacking the characteristic in others.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessary to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) an application hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The symbol $\triangleq$ is used herein to denote a mathematical definition.

Overview

Various embodiments provide methods, systems, apparatuses, and/or computer program products for the efficient determination of the value of callable instruments at one or more points in time. For example, various embodiments provide methods, systems, apparatuses, and/or computer program products for determining the value of callable instruments, possibly for multiple callable instruments, at a plurality of points in time (e.g., exercise dates of the callable instruments). Various embodiments are configured to determine and provide the value of callable instruments for one or more callable instruments at one or more points in time in real time or near real time with respect to receiving a corresponding request. Various embodiments provide an interactive user interface (IUI) through which a user may cause a request for value determination to be provided and through which a user may be provided a graphical and/or tabular representation of callable options values for one or more callable options at one or more points in time.

In various embodiments, the value of the callable instrument(s) are determined using a backward deep neural network (DNN) solver. In various embodiments, the problem for determining the value of the callable instrument(s) may be posed as a partial differential equation (PDE) and/or an equivalent backward stochastic differential equation (BSDE). In various embodiments, the value of the callable instrument(s) depends on an index (e.g., the Libor index and/or the like). The PDE and/or BSDE may be configured to describe the evolution of the value of the callable instrument with respect to the index. In various embodiments, the backward DNN solver, through machine learning, is trained to describe the sensitivity of the value of the callable instrument to changes in the corresponding index. For example, the backward DNN solver may use the sensitivity of the value of the callable instrument to changes in the corresponding index at various points in time to determine the value of the callable instrument at various points in time. In various embodiments, the DNN of the backward DNN solver comprises a plurality of sub-nets, with each sub-net corresponding to a time step of a time array (e.g., one of the multiple exercise dates). Each of the sub-nets are trained simultaneously such that the value of callable instrument at multiple points in time are determined through one training of the backward DNN solver.

In various embodiments, a training iteration of the backward DNN solver comprises determining a final value of the callable instrument at a final time in a time array and projecting the value of the callable instrument backward (possibly based on an index), through one or more intermediate values corresponding to one or more intermediate times of the time array, back to an initial value of the callable instrument corresponding to an initial time of the time array. This backward projection is performed along a plurality of paths (e.g., Monte Carlo paths) and a set of initial values of the callable instrument are determined therefrom. A statistical measure of spread (e.g., variance, standard deviation, and/or the like) for the set of initial values is determined and the weights and/or parameters of the backward DNN solver are modified to reduce the statistical measure of spread for the set of initial values determined on the next training iteration of backward projection for the plurality of paths. Once the backward DNN solver satisfies a convergence requirement (e.g., the statistical measure of spread is sufficiently small and/or the number of training iterations has reached a particular number) the resulting values of the callable instrument at the various points in time are provided (e.g., for display to a user via a user computing device, stored in memory for later use, and/or the like). This backward projection of the value of the callable instrument provides the basis of the name backward DNN solver. In various embodiments, the DNN of the backward DNN solver comprises a feedforward DNN. For example, the information within the backward DNN solver moves from the input nodes, through the hidden nodes, and out to the output nodes without forming any cycles or loops within the network.

The backward DNN solver allows for efficient determination of values of callable instruments at various points in time. Moreover, the backward DNN solver directly estimates the sensitivity of the value of the callable instrument to the corresponding index without introducing additional model assumptions. These features are in contrast to traditional means for determining values of a callable instrument. For example, traditional means for determining values of a callable instrument are computationally expensive as they require use of a Monte Carlo method using a very large number of Monte Carlo paths. For example, such Monte Carlo methods require more than a factor 10 more paths than backward DNN solver. Additionally, such traditional methods require additional modelling of the sensitivity of the value of the callable instrument to the corresponding index, which then introduces additional model assumptions.

Accordingly, the present disclosure sets forth systems, methods, apparatuses, and computer program products that accurately and computationally efficiently determine and provide the value of one or more callable instruments at various points of time (e.g., at one or more exercise dates). There are many advantages of these and other embodiments described herein. For instance, the computational efficiency of various embodiments of the backward DNN solver described herein allows for the providing of the value of one or more callable instruments at various points of time and/or an optimal calling strategy for one or more callable instruments in real time or near real time with respect to the receipt of a request for such. Thus, embodiments of the backward DNN solver may be used to inform decisions on relatively short time frames. In addition, since the backward DNN solver directly determines the sensitivity of the value of the callable instrument to the corresponding index, fewer model assumptions are used to determine the value of the callable instrument at various points of time.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment 100 within which embodiments of the present disclosure may operate to generate and provide callable options values and/or IUIs configured for providing callable options values. As illustrated, the example embodiment 100 may include one or more system computing devices 10 and one or more user computing devices 20. The one or more system computing devices and/or one or more user computing devices 20 may be in electronic communication with, for example, one another over the same or different wireless or wired networks 40. For example, a user computing device 20 may provide (e.g., transmit, submit, and/or the like) a request for callable options values to a system computing device 10 via one or more wireless or wired networks 40. For example, a system computing device may provide (e.g., transmit) callable options values to a user computing entity 20 via one or more wireless or wired networks 40.

The one or more system computing devices 10 may be embodied as one or more servers, such as that described below in connection with FIG. 2. The one or more system computing devices 10 may further be implemented as local servers, remote servers, cloud-based servers (e.g., cloud utilities), or any combination thereof. The one or more system computing devices 10 may receive, process, generate, and transmit data, signals, and electronic information to facilitate the operations of determining and providing callable options values. In various embodiments, a system computing device 10 may store and/or be in communication with one or more databases. In an example embodiment, the one or more databases may be embodied as one or more data storage devices, such as a Network Attached Storage (NAS) device or devices, or as one or more separate databases or servers. The one or more databases may store information accessed by the system computing device 10 to facilitate the operations of determining and providing callable options values. For example, the one or more databases may store control signals, device characteristics, and access credentials for one or more of the user computing devices 20.

Figure 3:
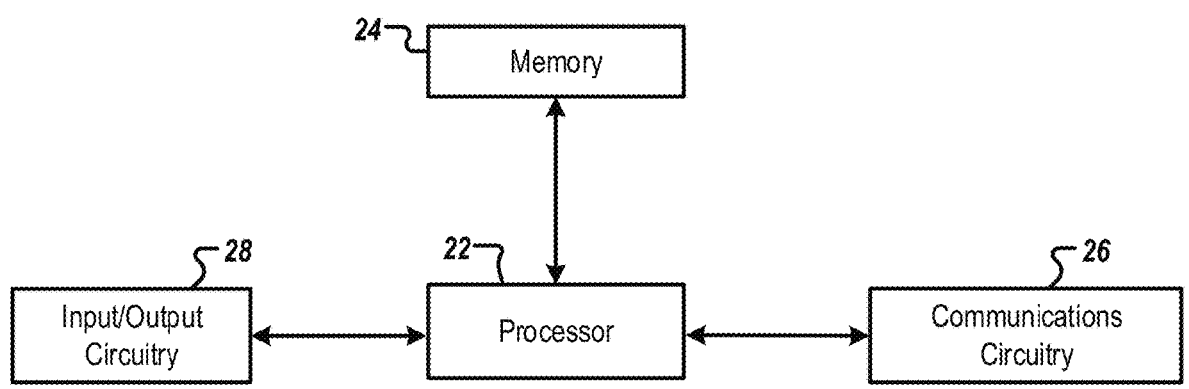
FIG. 3 is a block diagram of a user computing entity that may be specifically configured in accordance with an example embodiment described herein.

The one or more user computing devices 20 may be embodied by any computing devices known in the art, such as those described below in connection with FIG. 3. The system computing device 10 may receive information from, and transmit information to, the one or more user computing devices 20. For example, the system computing device 10 may receive a request for callable options values generated and provided by a user computing device 20. For example, the system computing device may provide callable options values such that a user computing device 20 receives the callable options values. It will be understood that in some embodiments, the one or more user computing devices 20 need not themselves be independent devices, but may be peripheral devices communicatively coupled to other computing devices.

Exemplary Computing Devices

The system computing device 10 described with reference to FIG. 1 may be embodied by one or more computing devices or servers, such as the example system computing device 10 shown in FIG. 2. As illustrated in FIG. 2, the system computing device 10 may include processing circuitry 12, memory 14, communications circuitry 16, input-output circuitry 18, solver circuitry 202, and deep neural network (DNN) circuitry 204, each of which will be described in greater detail below. In some embodiments, the system computing device 10 may further comprise a bus (not expressly shown in FIG. 2) for passing information between various components of the system computing device. The system computing device 10 may be configured to execute various operations described above in connection with FIG. 1 and below in connection with FIG. 4.

In some embodiments, the processor 12 (and/or co-processor or any other processing circuitry assisting or otherwise associated with the processor) may be in communication with the memory 14 via a bus for passing information among components of the apparatus. The processor 12 may be embodied in a number of different ways and may, for example, include one or more processing devices configured to perform independently. Additionally or alternatively, the processor may include one or more processors configured in tandem via a bus to enable independent execution of software instructions, pipelining, and/or multithreading. The use of the terms "processor" or "processing circuitry" may be understood to include a single core processor, a multi-core processor, multiple processors of the system computing device 10, remote or "cloud" processors, or any combination thereof.

In an example embodiment, the processor 12 may be configured to execute software instructions stored in the memory 14 or otherwise accessible to the processor. Alternatively or additionally, the processor 12 may be configured to execute hard-coded functionality. As such, whether configured by hardware or software methods, or by a combination of hardware with software, the processor 12 may represent an entity (e.g., physically embodied in circuitry) capable of performing operations according to an embodiment of the present invention while configured accordingly. Alternatively, as another example, when the processor 12 is embodied as an executor of software instructions, the software instructions may specifically configure the processor 12 to perform the algorithms and/or operations described herein when the software instructions are executed.

Memory 14 is non-transitory and may include, for example, one or more volatile and/or non-volatile memories. In other words, for example, the memory 14 may be an electronic storage device (e.g., a computer readable storage medium). The memory 14 may be configured to store information, data, content, applications, software instructions, or the like, for enabling the apparatus to carry out various functions in accordance with example embodiments contemplated herein.

The communications circuitry 16 may be any means such as a device or circuitry embodied in either hardware or a combination of hardware and software that is configured to receive and/or transmit data from/to a network and/or any other device, circuitry, or module in communication with the system computing device 10. In this regard, the communications circuitry 16 may include, for example, a network interface for enabling communications with a wired or wireless communication network. For example, the communications circuitry 16 may include one or more network interface cards, antennas, buses, switches, routers, modems, and supporting hardware and/or software, or any other device suitable for enabling communications via a network 40. Additionally or alternatively, the communication interface 16 may include the circuitry for causing transmission of such signals to a network or to handle receipt of signals received from a network.

In some embodiments, the apparatus 200 may include input/output circuitry 18 in communication configured to provide output to a user and, in some embodiments, to receive an indication of user input. The input/output circuitry 18 may comprise a user interface, such as a display, and may further comprise the components that govern use of the user interface, such as a web browser, mobile application, dedicated client device, or the like. In some embodiments, the input/output circuitry 18 may additionally or alternatively include a keyboard, a mouse, a touch screen, touch areas, soft keys, a microphone, a speaker, and/or other input/output mechanisms. The input/output circuitry 18 may utilize the processor 12 to control one or more functions of one or more of these user interface elements through software instructions (e.g., application software and/or system software, such as firmware) stored on a memory (e.g., memory 14) accessible to the processor 12.

In addition, the system computing device 10 further comprises solver circuitry 202, which includes hardware components designed for acting as a deep learning-based BSDE solver. The solver circuitry 202 may utilize processor 12, memory 14, or any other hardware component included in the system computing device 10 to perform these operations, as described in connection with FIG. 4 below. The solver circuitry 202 may further utilize communications circuitry 16 to receive callable options values requests and/or provide callable options values (e.g., in response to a request therefor), or may otherwise utilize processor 12 and/or memory 14 to access information/data and/or executable instructions (e.g., software) used to determine callable options values and/or to store determined callable options values, and/or the like. In an example embodiment, the functionality described herein as being performed by the solver circuitry 202 is performed through the execution executable instructions by the processor 12. In an example embodiment, the solver circuitry 202 comprises one or more graphical processing units (GPUs).

In addition, the system computing device 10 further comprises DNN circuitry 204, which includes hardware components designed for training and/or operating a DNN. The DNN circuitry 204 may utilize processor 12, memory 14, or any other hardware component included in the system computing device 10 to perform these operations, as described in connection with FIG. 4 below. The DNN circuitry 204 may further utilize processor 12 and/or memory 14 to access information/data and/or executable instructions for determining, providing, and/or storing one or more option value gradients, adjust network weights through the minimization of a loss function, and/or the like. In an example embodiment, the functionality described herein as being performed by the DNN circuitry 202 is performed through the execution executable instructions by the processor 12. In an example embodiment, the DNN circuitry 204 comprises one or more graphical processing units (GPUs).

Although these components 12-18 and 202-204 may in part be described using functional language, it will be understood that the particular implementations necessarily include the use of particular hardware. It should also be understood that certain of these components 12-18 and 202-204 may include similar or common hardware. For example, the solver circuitry 202 and DNN circuitry 204 may each at times leverage use of the processor 12 or memory 14, but duplicate hardware is not required to facilitate operation of these distinct components of the system computing device 10 (although duplicated hardware components may be used in some embodiments, such as those in which enhanced parallelism may be desired). The use of the term "circuitry" as used herein with respect to components of the model computing device 10 therefore shall be interpreted as including the particular hardware configured to perform the functions associated with the particular circuitry described herein. Of course, while the term "circuitry" should be understood broadly to include hardware, in some embodiments, the term "circuitry" may refer also to software instructions that configure the hardware components of the model computing entity 10 to perform their various functions.

To this end, each of the communications circuitry 16, input/output circuitry 18, solver circuitry 202 and DNN circuitry 204 may include one or more dedicated processors, specially configured field programmable gate arrays (FPGA), and/or application specific interface circuit (ASIC) to perform its corresponding functions, these components may additionally or alternatively be implemented using a processor (e.g., processor 12) executing software stored in a memory (e.g., memory 14). In this fashion, the communications circuitry 16, input/output circuitry 18, solver circuitry 202, and DNN circuitry 204 are therefore implemented using special-purpose components implemented purely via hardware design or may utilize hardware components of the system computing device 10 that execute computer software designed to facilitate performance of the functions of the communications circuitry 16, input/output circuitry 18, solver circuitry 202, and DNN circuitry 204.

The user computing device 20 described with reference to FIG. 1 may be embodied by one or more computing devices, personal computers, desktop computers, client devices (e.g., of the system computing device 10), and/or mobile devices, such as the example user computing device 20 shown in FIG. 3. The illustrated example user computing device 20 includes processing circuitry and/or processor 22, memory 24, communications circuitry 26, and input-output circuitry 28, each of which is configured to be similar to the similarly named components described above in connection with FIG. 2. In various embodiments, the processor 22, memory 24, and input-output circuitry 28 are configured to provide an IUI configured for user interaction (e.g., via the input-output circuitry 28). For example, the IUI may be configured to receive user input initiating a callable options values request and/or to provide callable options values.

In some embodiments, various components of the system computing device 10 and/or user computing device 20 may be hosted remotely (e.g., by one or more cloud servers) and thus need not physically reside on the corresponding computing device 10, 20. Thus, some or all of the functionality described herein may be provided by third party circuitry. For example, a given computing device 10, 20 may access one or more third party circuitries via any sort of networked connection that facilitates transmission of data and electronic information between the computing device 10, 20 and the third party circuitries. In turn, that computing device 10, 20 may be in remote communication with one or more of the other components describe above as comprising the computing device 10, 20.

As will be appreciated based on this disclosure, example embodiments contemplated herein may be implemented by a system computing device 10 and/or user computing device 20. Furthermore, embodiments may take the form of a computer program product on at least one non-transitory computer-readable storage medium (e.g., memory 14, 24) storing software instructions. Any suitable non-transitory computer-readable storage medium may be utilized, some examples of which are non-transitory hard disks, CD-ROMs, flash memory, optical storage devices, and magnetic storage devices. It should be appreciated, with respect to certain system computing devices 10 as described in FIG. 2 or user computing devices 20 as described in FIG. 3, that loading the software instructions onto a computer or apparatus produces a special-purpose machine comprising the means for implementing various functions described herein.

Having described specific components of example system computing devices 10 and user computing devices 20, example embodiments are described below in connection with a series of flowcharts.

Example Backward DNN Solver

In various embodiments, a backward DNN solver is used to determine the value of one or more callable instruments at various points in time (e.g., exercise dates). In various embodiments, the one or more callable instruments may be priced and/or the value may evolve based on an index. In various embodiments, the index is the Libor rate. For example, the callable instruments may be interest rate options under the Libor Market Model (LMM) setting. However, various other indices may be used in various other embodiments. The following provides a description of a formulation of an example embodiment of a backward DNN solver wherein the index corresponding to the one or more callable instruments is the Libor rate as represented by the LMM.

Starting with a description of the LMM, we start with a maturity time T>0 and a complete filtered probability space $(\Omega, \mathcal{F}, P, \mathbb{F})$ satisfying the usual conditions, where the filtration $\mathbb{F} = \{\mathcal{F}_t\}_{0 \le t \le T}$ is the natural filtration generated by the standard Brownian motion $\{W_t\}_{0 \le t \le T}$ (which may be high dimensional) and augmented by all P-null sets. The model tenor structure is a set of dates, i.e. $0 = T_0 < T_1 < \ldots < T_N$, characterized by intervals $\tau_i = \tau(T_{i+1} - T_i)$, $\forall i = 0, 1, \ldots, N-1$. The vector standard Brownian motion is specified as $W^n(t)$, where $n = 1, 2, \ldots, N-1$ for all generated $\mathbb{F} = \{\mathcal{F}_t\}_{0 \le t \le T}$. In various embodiments, the values of $\tau_i$ correspond to two weeks, one month, three months, six months, a year, and/or the like. For example, in an example embodiment, $$\tau(T_{i+1} - T_i) = \frac{T_{i+1} - T_i}{365}.$$

In an example embodiment, $$\tau(T_{i+1} - T_i) = \frac{T_{i+1} - T_i}{360}.$$

In various embodiments, the forward Libor rate is used to determine the value of one or more callable instruments at various points in time. Let P(t, T) denote the price at time t of a zero-coupon bond delivering for certain $1 at the maturity time T, for the tenor structure described above. The forward Libor rates $L(t; T_n, T_{n+1})$ are then defined as $$L(t; T_n, T_{n+1}) \triangleq L_n(t) = \frac{1}{\tau_n}\left(\frac{P(t, T_n)}{P(t, T_{n+1})} - 1\right),$$ (Equation 1)

$$1 \le q(t) \le n \le N-1$$

where q(t) is the tenor structure index of the shortest-dated discount bond still alive at time t. In other words, q(t) represents the unique integer such that $T_{q(t)-1} \le t \le T_{q(t)}$, $\forall t \le T_N$. For simplicity, we denote $L(t) \triangleq (L_1(t), L_2(t), \ldots, L_{N-1}(t))$.

In various embodiments, $L_n(t)$ is a martingale in the $T_{N+1}$—forward measure $Q^{T_{N+1}}$ such that $L_n(t)$ follows the stochastic differential equation $$dL_n(t) = \sigma_n(t, L_n(t)) dW^{n+1}(t)$$ (Equation 2)

Where $W^{n+1}(t) = w^{T_{n+1}}$ is a d-dimensional Brownian motion in forward measure $Q^{T_{n+1}}$ and $\sigma_n(t, L_n(t))$, the vector volatility function, is a row vector in $\mathbb{R}^d$. In general, $d \le N-1$ is a positive integer. In various embodiments, the lognormal version of the LMM is used and $\sigma_n(t, L_n(t)) \triangleq \psi(t) L_n(t)$.

To simplify the notation, we define $\xi_i(t, L_n(t)) \triangleq \|\sigma_i(t, L_n(t))\| \in \mathbb{R}^1$, where $\|x\|$ is the Euclidean-norm of x in $\mathbb{R}^d$. Under the terminal measure $Q^{T_N}$, we have $$dW^{n+1}(t) = -\sum_{j=n+1}^{N-1} \frac{\tau_j \sigma_j(t, L_j(t))}{1 + \tau_j L_j(t)} dt + dW^N(t),$$

which, when plugged in to Equation 2 provides the process for $L_n(t)$ as $$dL_n(t) = \sigma_n(t, L_n(t))\left(-\sum_{j=n+1}^{N-1} \frac{\tau_j \sigma_j(t, L_j(t))}{1 + \tau_j L_j(t)} dt + dW^N(t)\right) =$$ (Equation 3)

$$-\sum_{j=n+1}^{N-1} \frac{\tau_j \xi_n(t, L_n(t)) \xi_j(t, L_j(t)) \rho_{n,j}}{1 + \tau_j L_j(t)} dt + \xi_n(t, L_n(t)) dW_n^N(t) \triangleq$$

$$\mu_n(t, L_n(t)) dt + \xi_n(t, L_n(t)) dW_n^N(t)$$

where $W_n^N(t)$ is a one-dimensional standard Brownian motion for the forward Libor rate $L_n(t)$ under the terminal measure $Q^{T_N}$, $\mu_n(t, L_n(t))$ is the drift term, and a constant correlation $\{\rho_{i,j}\}$ is assumed for components of $W^N$ where $dW_n^N(t) dW_j^N(t) = \rho_{n,j} dt$. Therefore, under spot measure $Q^B$, the process for $L_n(t)$ is $$dL_n(t) = \sigma_n(t, L_n(t))\left(-\sum_{j=q(t)}^{n} \frac{\tau_j \sigma_j(t, L_j(t))}{1 + \tau_j L_j(t)} dt + dW^B(t)\right) =$$ (Equation 4)

$$\sum_{j=q(t)}^{n} \frac{\tau_j \xi_n(t, L_n(t)) \xi_j(t, L_j(t)) \rho_{n,j}}{1 + \tau_j L_j(t)} dt + \xi_n(t, L_n(t)) dW_n^B(t) \triangleq$$

$$\mu_n(t, L_n(t)) dt + \xi_n(t, L_n(t)) dW_n^B(t)$$

where $W^B(t)=W^B$ is a d-dimensional Brownian motion under spot measure $Q^B$, $W_n^B(t)$ is a one-dimensional Brownian motion driving the forward Libor rate $L_n(t)$ under spot measure $Q^B$, and $dW_n^B(t)dW_j^B(t)=\sigma_{n,j}dt$.

Under the spot measure $Q^B$, the numeraire B(t) is $B(t)=P(t,T_{q(t)})\Pi_{n=0}^{q(t)-1}(1+\tau_n L_n(T_n))$.

In various embodiments, the vector volatility function is specified as $\sigma_n(t, L_n(t))=\lambda_n(t)\varphi(L_n(t))$, where $\lambda_n(t)$ is a bounded row-vector of deterministic functions and $\varphi: \mathbb{R} \to \mathbb{R}$ is a time-homogenous local volatility function. In various embodiments, the local volatility function may be a lognormal model (e.g., $\varphi(x)=x$), a constant elasticity of variance (CEV) model (e.g., $\varphi(x)=x^p$, where $0<p<1$), a limited CEV (LCEV) model (e.g., $\varphi(x)=\min(\varepsilon^{p-1}, x^{p-1})$, where $0<p<1$ and $\varepsilon>0$), a displaced lognormal model (e.g., $\varphi(x)=bx+a$, where $b>0$ and $a\neq 0$), and/or the like.

In general, the LMM can capture non-trivial curve movements, including not only parallel shifts, but also "rotational steepening" and "humps," which is achieved through the use of vector-valued Brownian motion drivers with correlation. In various embodiments, the simple correlation structure is used such that the Libor rates $L_i(t)$, $i=1, 2, \ldots, N-1$ are controlled by the correlation function $\rho_{i,j}=\exp(-\beta|i-j|)$. In various embodiments, $d=N-1$, such that each $L_i(t)$ is driven by one Brownian motion $W_i^N(t) \in \mathbb{R}$. Under such a postulation, the Brownian motion $dW^N(t)=\mathbb{R}^{1/2}dW(t)$, where $\varrho=(\rho_{i,j})$, $i, j=1, 2, \ldots, N-1$ and W(t) is a standard Brownian motion in $\mathbb{R}^{N-1}$.

Now that the LMM, an example index that may be used in various embodiments, has been described, some example embodiments of the backward DNN solver using the LMM as the index corresponding to the callable instruments will now be described. We start with the example of a European option. A European option is a type of put or call option of an instrument that can be exercised only on its expiration date. A European option is characterized by it payoff function G, which determined the amount G(L(t)) that the option pays at the expiration of the option (e.g., when t=T, with T being the expiration date). The arbitrage-free discounted value function u(t, L(t)) of the option relative to the numeraire A(t) (also referred to as the discounted option price herein) is given by $$u(t, L(t)) = A(t)E^{Q^A}\left(\frac{G(L(T))}{A(t)} \bigg| F_t\right) \quad \text{(Equation 5)}$$

where $L(t) \in \mathbb{R}^{N-1}$ is the vector of all forward Libor rates $L_i(t)$, $i=1, 2, \ldots, N-1$. Applying Ito's formula, the stochastic differential equation for u(t, L(t)) is $$du(t, L(t)) = u_t dt + \sum_{i=1}^{N-1} u_i dL_i(t) + \frac{1}{2}\sum_{i,j=1}^{N-1} u_{i,j}dL_i(t)dL_j(t) \quad \text{(Equation 6)}$$

where $u_i = u_{L_i}$ and $u_{i,1} = u_{L_i L_j}$.

By substituting Equation 3 under the terminal measure $Q^{T_N}$ or Equation 4 under the spot measure $Q^B$ into Equation 6, we have $$du(t, L(t)) = \left(u_t + \sum_{i=1}^{N-1}\mu_i(t)u_i + \frac{1}{2}\sum_{i,j=1}^{N-1}\xi_i(t)\xi_j(t)u_{i,j}\right)dt + \sum_{i=1}^{N-1}\xi_i(t)u_i dW_i^N(t). \quad \text{(Equation 7)}$$

In various embodiments, in order to comply with the arbitrage-free condition, the process u(t, L(t)) is a martingale under the measure $Q^A$ which corresponds to the numeriare process A(t). Thus, in various embodiments, the drift term must be equal to zero, such that $$u_t + \sum_{i=1}^{N-1}\mu_i(t)u_i + \frac{1}{2}\sum_{i,j=1}^{N-1}\xi_i(t)\xi_j(t)u_{i,j} = 0.$$

When written in matrix form, this gives $$du(t, L(t)) = u_t dt + \nabla u dL(t) + \frac{1}{2}dL(t)^T(\text{Hess}_L u)dL(t) = \left(u_t + \nabla u \mu + \frac{1}{2}Tr\left(\sum^T \sum \text{Hess}_L u\right)\right)dt + \nabla u \sum dW(t) \quad \text{(Equation 8)}$$

where $\text{Hess}_L u$ is the Hessian matrix of u(t, L(t)), μ is an (N−1)-dimensional vector, and Σ is the (N−1)×(N−1) matrix $(\xi_i \xi_j \rho_{i,j})$, $i, j=1, 2, \ldots, N-1$. In embodiments where the drift term is equal to zero, we have $$u_t + \nabla u\mu + \frac{1}{2}Tr\left(\sum^T \sum \text{Hess}_L u\right) = 0. \quad \text{(Equation 9)}$$

This partial differential equation can then be reformulated as a backward stochastic differential equation (BSDE). In particular, we have $$dL(t) = \mu(t, L(t))dt + \sum(t, L(t))dW(t), \quad \text{(Equation 10)}$$

$$Y(T) = \frac{G(L(T))}{A(T)} \triangleq g(L(T)), \text{ and}$$

$$dY(t) = Z(t)\sum(t, L(t))dW(t).$$

We further define $$g(t) \triangleq \frac{G(L(t))}{A(t)}.$$

A standard generalized Feynman-Kac formula provides $$Y(t)=u(t,L(t)) \text{ and } Z(t)=\nabla_L u(t,L(t)). \quad \text{(Equation 11)}$$

It is noted that the gradient of u with respect to L ($\nabla_L u(t,L(t))$) is a row vector. The BSDE may then be written as $$du(t,L(t))=\nabla_L u \Sigma dW(t). \quad \text{(Equation 12)}$$

As noted above, the European option only provides for calling or putting the option on the expiration date (e.g., the maturity date) of the option. However, various other instruments provide for multiple possible exercise dates. For example, Bermudan swaptions are one such example instrument. A Bermudan option is a type of derivative security with an early exercise that could take place on a discrete set of dates (e.g., exercise dates) and is characterized by an adapted payout process U(t, L(t)), payable to the option holder at a stopping time (e.g., an exercise date) $\tau \leq T$ chosen by the option holder, where T is the maturity date (e.g., final exercise date) of the option. We denote the allowed (and deterministic) set of exercise dates larger than or equal to time t (e.g., the exercise dates that occur at or after time t) as z,61 (t); and suppose at time $t_0=0$ a given exercise policy $\tau$ having values z,61 (0), and a pricing numeraire A(t) corresponding to a unique martingale measure $Q^A$. We define $V^\tau(0)$ be the time $t_0=0$ value of the instrument that pays U($\tau$, L($\tau$)) at exercise time $\tau$. We can then write $$V^\tau(0) = A(0) E^{Q^A}\left(\frac{U(\tau, L(\tau))}{A(\tau)}\right).$$

We let $\mathcal{T}$ (r) be the time t set of (future) stopping times taking values in $\mathcal{D}$ (t). In the absence of arbitrage, the time t value of the instrument with early exercise into U is then given by the optimal stopping problem $$V(t, L(t)) = sup_{\tau \in \mathcal{T}(t)} V^\tau(t) = sup_{\tau \in \mathcal{T}(t)} A(t) E^{Q^A}\left(\frac{U(\tau, L(\tau))}{A(\tau)}\right).$$

Suppose we have $\mathcal{D}$ (0)=$t_{k_1}$, $t_{k_2}$, . . . , $t_{k_p}$, where $t_{k_p}$=T. For $t < t_{k_{i+1}}$, define $H_i(t, L(t))$ as the time t value of the Bermudan option when exercise is restricted to dates $\mathcal{D}$ ($t_{k_{i+1}}$)=$t_{k_{i+1}}$, $t_{k_{i+2}}$, . . . , $t_{k_p}$. That is $$H_i(t, L(t)) = A(t) E_t^{Q^A}\left[\frac{V(t_{k_{i+1}}, L(t_{k_{i+1}}))}{A(t_{k_{i+1}})}\right],$$

$i = 1, \ldots, p-1$. At time $t_{k_i}$, $H_i(t_{k_i}, L(t_{k_i}))$ can be interpreted as the hold value of the Bermudan option, that is, the value of the Bermudan option at time $t_{k_i}$ if not exercised at time $t_{k_i}$. If an optimal exercise policy is followed, than at time $t_{k_i}$ we have $V(t_{k_i}, L(t_{k_i}))$=max[U($t_{k_i}$, L($t_{k_i}$)), $H_i(t_{k_i}, L(t_{k_i}))$], i=1, . . . p-1, such that for i=1, . . . , p-1, $$H_i(t, L(t)) = \quad \text{(Equation 13)}$$
$$A(t) E_t^{Q^A}\left(\max\left[U(t_{k_{i+1}}, L(t_{k_{i+1}})), \frac{H_{i+1}(t_{k_{i+1}}, L(t_{k_{i+1}}))}{A(t_{k_{i+1}})}\right]\right).$$

Starting with terminal condition $$\frac{H_p(T, L, (T))}{A(T)} = g(L(T)),$$

Equation 13 defines an iteration backward in time from the terminal condition (e.g., at time T, the maturity date and/or final exercise date) to the initial value at time $t_0=0$, V(0)= $H_0(0)$. In more details, for an i∈ 1, . . . , p-1, we can price $$\frac{H_i(t, L(t))}{A(t)} \text{ for } t \in [t_{k_{i-1}}, t_{k_i}],$$

similarly as u(t, L(t)) in the European option example, given that $$\frac{H_{i+1}(t, L(t))}{A(t)}$$

is already priced in advance. This allows for the backward iteration in time for sub-intervals [$t_{k_{i-1}}$, $t_{k_i}$]. In various embodiments, the backward DNN solver is configured to parameterize and learn and/or approximate all $$\frac{H_i(t, L(t))}{A(t)}, i = 1, \ldots, p-1$$

all together in one backward discretization run instead of learning them one by one.

To derive the backward DNN solver, we first discretize the Libor rate stochastic differential equation (Equation 3 under the terminal measure and Equation 4 under the spot measure) and the option price BSDE. Prior to the discretization, the time discretization is set to be $0=t_0 < t_1 < \ldots < t_m = T_{N-1}$. Thus, m is the total number of time grid points and the terminal time/last grid point is T=$T_{N-1}$.

The Libor rate stochastic differential equation (e.g., Equation 3 or 4) is discretized under the terminal measure or spot measure for Libor rates $L_n(t)$ such that $L_n(t_{i+1}) \neq L_n(t_i) + \int_{t_i}^{t_{i+1}} \mu_n(t, L(t)) dt + \int_{t_i}^{t_{i+1}} \xi_n(t, L(t)) dW_n(t)$ (Equation 14)

for $0 \leq i \leq N-1$. Various discretization schemes may be used discretize the Libor stochastic differential equations in various embodiments. For example, in an example embodiment, a Euler scheme is used to discretize the Libor stochastic differential equations. In another example embodiment, a predictor-corrector scheme is used to discretize the Libor stochastic differential equations.

The BSDE of the discounted price option is $u(t_i, L(t_i)) \approx u(t_{i+1}) - \nabla u(t_i, L(t_i)) \sigma(t_i, L(t_i))(W(t_{n+1}) - W(t_n))$ (Equation 15)

for $0 \leq i \leq N-1$.

In various embodiments, the path $\{L(t)_{0 \leq t \leq T_{N-1}}\}$ is sampled using Equation 14. Next, the function L(t)→$\nabla$u(t, L(t))σ(t, L(t)) is approximated at each time step t=$t_i$ by a DNN such as a multilayer feedforward neural network for i=1, 2, . . . , N-1, based on $\nabla u(t_i, L(t_i)) \sigma(t_i, L(t_i)) = (\nabla u \sigma)(t_i, L(t_i)) \approx (\nabla u \sigma)(t_i, L(t_i) | \theta_i),$ (Equation 16)

where $\theta_i$ denotes the weights and/or parameters of an $i^{th}$ sub-network approximating L(t)→$\nabla$u(t, L(t))σ(t, L(t)) at time t=$t_i$. Thereafter, the sub-networks in Equation 16 are stacked to form a DNN of the backward DNN solver as a whole, based on Equation 15.

Thus, the backward DNN solver takes as inputs the Libor rate path $\{L(t_i)\}_{0\leq i\leq m}$ and the Brownian motion path $\{W(t_i)\}_{0\leq i\leq m}$ and provides the final outputs (e.g., the value of the instrument at each time $t_i$, $0\leq i\leq m$, in an example embodiment). For example, the backward DNN solver may provide the initial value (e.g., the value of the instrument at time $t_0=0$) and the gradient (possibly for each time $t_i$, $0\leq i\leq m$, and/or one or more times $t_i$, $0\leq i\leq m$) as output. For example, Equation 14 may be used to project the Libor rates (e.g., the index corresponding to the callable instrument in this example) forward from $(t_o, L(t_o))$ to $(t_{N-1}, L(t_{N-1}))$ to define the Libor rate path $\{L(t_i)\}_{0\leq i\leq m}$ (where m=N−1). The Brownian motion path $\{W(t_i)\}_{0\leq i\leq N-1}$ may be determined using, for example the Wiener process. The final Libor rate $(t_{N-1}, L(t_{N-1}))$ is used to determine the final discounted payoff option $u(t_{N-1}, L(t_{N-1}))=g(L(T_{N-1}))$. The backward DNN solver then uses Equation 15 to project the discounted payoff option from $u(t_{N-1}, L(t_{N-1}))$ backward through the intermediate times u $(t_i, L(t_i))_{0<i<m}$ and back to the initial time $u(t_0, L(t_0))$. For example, the backward DNN solver may project the discounted option payoff from the final value, through the intermediate values, back to the initial value $u(t_0, L(t_0))$ via $$u(t_i,L(t_i))=u(t_{i+1},L(t_{i+1}))-(\nabla u\sigma)(t_i,L(t_i))|\theta_i)(W(t_{i+1})-W(t_i))$$ (Equation 17)

for i=N−1, ... , 1, 0, where $\theta_i$ is the weight and/or parameter of the backward DNN solver describing the sensitivity of the discounted option payoff to the Libor rate at time $t_i$.

As should be noted, the determination of the Brownian motion path $\{W(t_i)\}_{0\leq i\leq m}$, which is used to determine the Libor rate path $\{L(t_i)\}_{0\leq i\leq m}$, is a stochastic process. Thus, multiple paths (e.g., multiple Brownian motion paths $\{W(t_i)\}_{0\leq j\leq m}\}_\alpha$ and corresponding Libor rate paths $\{L(t_i)\}_{0\leq i\leq m}\}_\alpha$ are determined for $0\leq\alpha\leq M$, where M+1 paths are considered). In various embodiments, the M+1 paths are Monte Carlo paths. For example, Monte Carlo methods may be used in determine the multiple Brownian motion paths $\{W(t_i)\}_{0\leq i\leq m}\}_\alpha$ which are then used to generate the corresponding Libor rate paths $\{L(t_i)\}_{0\leq i\leq m}\}_\alpha$. The final discounted option payoff for each path is then projected back, through the intermediate discounted option payoffs, back to the initial discounted option payoff (also referred to as the initial value herein) such that a set of initial discounted payoffs $\{u(t_0, L(t_0))_\alpha\}_{0\leq\alpha\leq M}$ is determined and/or defined.

As each of the M+1 paths correspond to the same instrument, the initial discounted payoff option $u(t_0, L(t_0))_\alpha$ for all $0\leq\alpha\leq M$ should be the same value. For example, the initial value $u(t_0, L(t_0))$ of the callable instrument is, in theory, independent of the path. Thus, it is expected that $u(t_0, L(t_0))_{\alpha_j}\approx u(t_0, L(t_0))_{\alpha_k}$ for j, k=0, 1, ... , M. A statistical measure of spread (e.g., variance, standard deviation, and/or the like) may be determined for the set of initial discounted payoffs $\{u(t_0, L(t_0))_\alpha\}_{0\leq\alpha\leq M}$. The statistical measure of spread may then be used to refine the set of weights and/or parameters $\{\theta_i\}_{0\leq i\leq m}$ of the backward DNN solver. For example, the set of weights and/or parameters $\{\theta_i\}_{0\leq i\leq m}$ of the backward DNN solver maybe trained and/or refined by minimizing an expected loss function. In an example embodiment, the expected loss function $l(\theta)$, for error function $\varepsilon$, is $$l(\theta)=\varepsilon[|u(t_o,L(t_o))-\varepsilon(u(t_o,L(t_o)))|^2].$$ (Equation 18)

In various embodiments, M+1 paths are considered. Thus, Equation 18 may be rewritten as $$l(\theta) = \frac{1}{M+1}\sum_{\alpha=0}^{M}\left(u_\alpha(t_o, L(t_0)) - \frac{1}{M+1}\sum_{\alpha=0}^{M}u_\alpha(t_o, L(t_0))\right)^2.$$ (Equation 19)

For example, multiple iterations of determining the set of initial discounted payoffs $\{u(t_0, L(t_0))_\alpha\}_{0\leq\alpha\leq M}$ (projecting the final discounted payoff backward through the intermediate discounted payoffs and back to the initial discounted payoff) may be performed as the weights and/or parameters $\{\theta_i\}_{0\leq i\leq m}$ of the backward DNN solver are modified and/or adjusted to minimize the excepted loss function $l(\theta)$. For example, the determination of the set of initial discounted payoffs $\{u(t_0,L(t_0))_\alpha\}_{0\leq\alpha\leq M}$ may be iterated until a convergence requirement is met (e.g., the statistical measure of spread satisfies a spread threshold requirement (e.g., is smaller than a spread threshold), the number of iterations reaches a set maximum iteration number, and/or the like). In an example embodiment, a stochastic gradient descent algorithm is used to optimize the weights and/or parameters $\{\theta_i\}_{0\leq i\leq m}$ of the backward DNN solver and to minimize excepted loss function $l(\theta)$.

Once the convergence requirement is met (e.g., after minimizing the loss function $l(\theta)$), the initial discounted option price is set as $$\overline{u(t_o, L(t_0))} = \frac{1}{M+1}\sum_{\alpha=0}^{M}u_\alpha(t_0, L(t_0))$$

and the DNN approximated $\varepsilon(\nabla u(t_o,L(t_o)))$ can be used as the initial Libor Delta, in various embodiments.

As should be understood, the backward DNN solver learns to approximate the option price gradients via the adjustment, modification, refinement, and/or the like of the weights and/or parameters $\{\theta_i\}_{0\leq i\leq m}$ of the backward DNN solver. Thus, the initial discounted option price and the gradients (e.g., describing the sensitivity of the discounted payoffs to the Libor rate) are not determined based on model assumptions, but are rather determined through the trained backward DNN solver.

Figure 4:
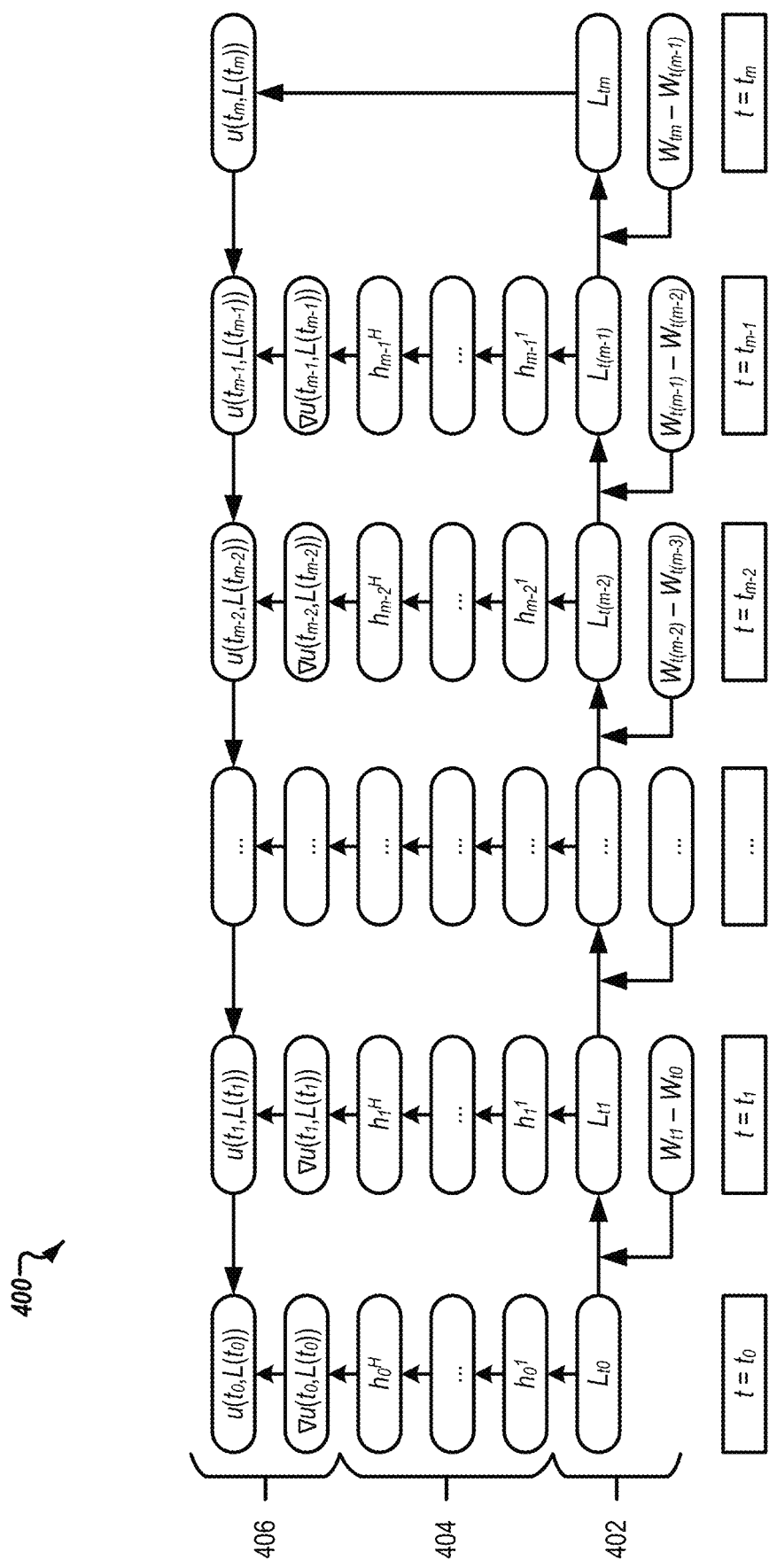
FIG. 4 is a block diagram showing an example architecture of a deep backward stochastic differential equation (BSDE) backward solver for determining callable options values, in accordance with an example embodiment described herein.

FIG. 4 provides a block diagram showing an example architecture of a backward DNN solver 400, in accordance with an example embodiment described herein. The input layers 402 are configured to receive a Libor rate path $\{L(t_i)\}_{0\leq i\leq m}$ and the corresponding Brownian motion path $\{W(t_i)\}_{0\leq i\leq m}$. The hidden layers 404 receive information/data from the input layers 402, apply the weights and/or parameters $\{\theta_i\}_{0\leq i\leq m}$ of the backward DNN solver and provide information/data to the 1 output layers 406. In various embodiments, the hidden layers 404 comprise one to ten hidden layers. For example, in an example embodiment, the hidden layers 404 comprise four hidden layers. In another example embodiment, the hidden layers 404 comprise two hidden layers. In various embodiments, the output layers 406 provide the set of the discounted payoffs $\{u(t_i, L(t_i))\}_{0\leq i\leq m}$ and the set of gradients $\{\nabla u(t_i,L(t_i))\}_{0\leq i\leq m}$. In various example embodiments, the output layer may only provide the set of the discounted payoffs $\{u(t_i, L(t_i))\}_{0 \leq i \leq m}$, the set of gradients $\{\nabla u(t_i, L(t_i))\}_{0 \leq i \leq m}$, or the initial discounted payoff $u(t_0, L(t_0))$. For example, the determination of the set of the discounted payoffs $\{u(t_i, L(t_i))\}_{0 \leq i \leq m}$ may be performed by the backward DNN solver outside of the DNN of the backward DNN solver based on the set of gradients $\{\nabla u(t_i, L(t_i))\}_{0 \leq i \leq m}$ provided via the output layers of the DNN of the backward DNN solver.

As can be seen from FIG. 4, the backward DNN solver includes three types of connections. The first type of connection, $(L(t_i), W(t_{i+1})-W(t_i)) \rightarrow L(t_{i+1})$ is characterized by Equation 14 and a discretization scheme (e.g., Euler discretization, predictor-correlator discretization, and/or the like). Thus, there are no weights and/or parameters to be optimized for this first type of connection. The second type of connection, $L(t_i) \rightarrow h_i^1 \rightarrow h_i^2 \rightarrow \ldots \rightarrow h_i^H \rightarrow \nabla u(t_i, L(t_i))$ is the multilayer feedforward neural network of the backward DNN solver 400 approximating the gradients describing the sensitivity of the discounted payoff to the Libor rate at time $t_i$. For each point in time $t_i$, there are H hidden layers $h_i^1, \ldots, h_i^H$. The weights and/or parameters $\theta_i$ of this sub-network are optimized through the minimization of the loss function (e.g., the minimization of the statistical measure of spread of the set of initial discount payoffs). In particular, the weights and/or parameters $\theta_i$ describe and/or control the linear/nonlinear transformation from the input layers 402 to the first hidden layer $h_i^1$, between the hidden layers, and from the last hidden layer $h_i^H$ to the output layer 406. The weights and/or parameters $\theta_i$ include any potential batch-normalization parameters involved in the process as well, in an example embodiment. The third type of connection, $(u(t_{i+1},L(t_{i+1})), \nabla u(t_i,L(t_i)), W(t_{i+1})-W(t_i)) \rightarrow u(t_i, L(t_i))$ is the backward iteration that results in the approximation of $u(t_0, L(t_0))$, which is completely characterized by Equation 17. Thus, there are no weights and/or parameters to be optimized for this third type of connection.

A marked advantage of the backward DNN solver, compared to traditional methods that determine an initial price and then project the price forward in time to determine the discounted payoffs, is the ability to price callable instruments having multiple exercise dates. For example, when passing one exercise date, using an example embodiment of the backward DNN solver, the exercise information on this exercise date may be used to update the value according to $$u(t_-,L(t_-))=\max(u(t_+,L(t_+)),\text{DiscIntrinsicValue}(t)), \quad \text{(Equation 20)}$$

Where $t_-$ represents the time immediately before the exercise time, $t_+$ represents the time immediately after the exercise time, and DiscIntrinsicValue(t) represents the discounted intrinsic value for option at the exercise time, which depends on the type of the option and/or terms of the callable instrument. For example, the discounted intrinsic value for a receiver Bermudan swaption at exercise time t is DiscIntrinsicValue$(t)=(\Sigma_{i=q(t)}^{N-1}(K-L_i(t)\tau_i)/(\Pi_{j=0}^{q(t)-1}(1+L_j(t)\tau_j)$, where K is the fixed rate of the underlying swap, q(t) is the index of the first Libor rate (or other index) which is not reset at exercise time t, N is the total number of Libor rates, and T is the accrual time. This representation assumes that the accrual time for fixed legs and float legs is the same and exercise time t is part of the reset dates of the Libor rates.

Continuing with the example of the Bermudan swaption, consider a Bermudan swaption with exercise dates on $t_{k_1}, \ldots, t_{k_p}$, where all the exercise dates are part of the Libor reset dates (e.g., within the set of dates $\{t_i\}$, and the last exercise date is the final Libor reset date (e.g., $t_{k_p}=t_{N-1}$). Equation 17 may then be modified such that the discounted payoff may be iterated backward in time via (Equation 21)

$$u(t_i, L(t_i)) = \begin{cases} u(t_{i+1}, L(t_{i+1})) - (\nabla u\sigma)(t_i, L(t_i) \mid \theta_i)(W(t_{i+1}) - W(t_i)) & \text{for } i \notin \{k_1, \ldots, k_p\} \\ \max\begin{Bmatrix} u(t_{i+1}, L(t_{i+1})) - (\nabla u\sigma)(t_i, L(t_i) \mid \theta_i)(W(t_{i+1}) - W(t_i)), \\ \text{DiscIntrinsicValue}(t_i) \end{Bmatrix} & \text{for } i \in \{k_1, \ldots, k_p\} \end{cases}$$

Here, the exercise dates partition the time horizon into multiple time intervals $(t_0, t_{k_1}), (t_{k_1}, t_{k_2}), \ldots, (t_{k_{p-1}}, t_{k_p})$ and the iteration formula within each time interval remains the same as described above. Between the time intervals (e.g., at the exercise dates), the backward update is now the maximum of (1) the first order approximation of the price function with information carried backwards (e.g., the backward iteration described above) and (2) the current exercise value, in various embodiments.

Between any two consecutive exercise dates (e.g., within the time intervals), the discount payoff u is the approximation of the holding value for that specific time interval (e.g., $H_i$ described above).

Example Operation of a System Computing Device

Figure 2:
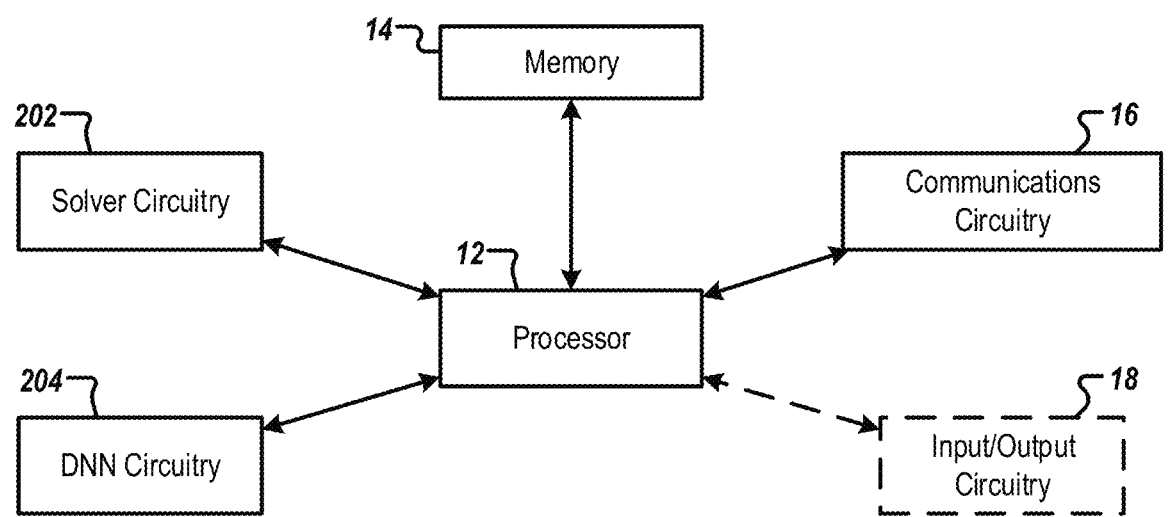
FIG. 2 is a block diagram of a model computing entity that may be specifically configured in accordance with an example embodiment described herein.
Figure 5:
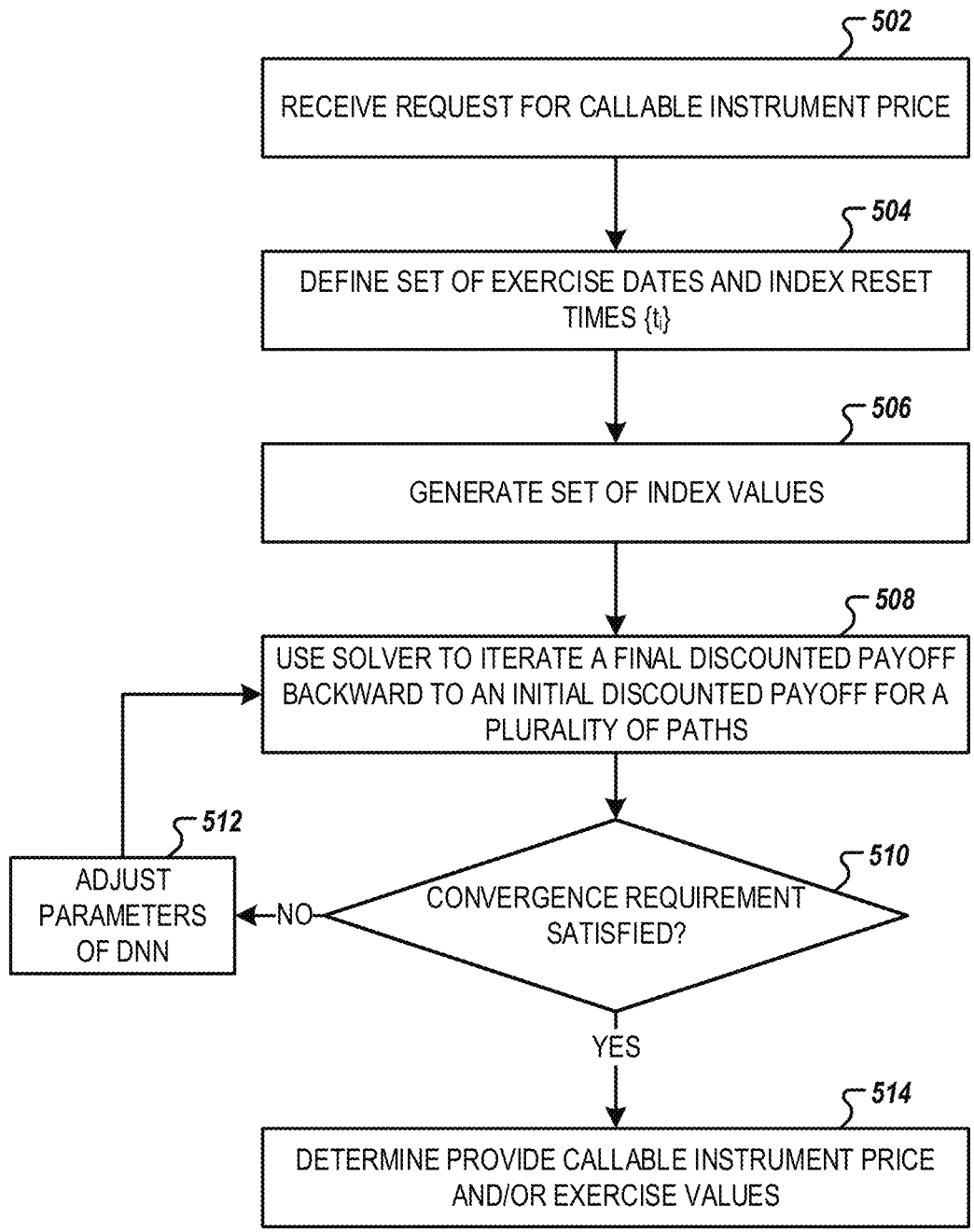
FIG. 5 is a flowchart illustrating operations performed, such as by the model computing entity of FIG. 2 to provide callable options values, in accordance with an example embodiment described herein.

FIG. 5 provides flowchart illustrating operations performed, such as by the model computing entity of FIG. 2 to provide callable options values, in accordance with an example embodiment described herein. Starting at block 502, a request for callable instrument pricing is received. For example, the system computing device 10 may receive a request for callable instrument pricing. For example, the system computing device 10 may comprise means, such as processor 12, memory 14, communications interface 16, user interface 18, and/or the like, for receiving a request for callable instrument pricing. In various embodiments, the request for callable instrument pricing comprises and/or indicates one or more terms and/or features of the callable instrument to be priced. For example, the request for callable instrument pricing may include a corresponding index (e.g., the Libor rate in above described example), one or more exercise dates, an origination date (e.g., $t_0$), a maturity date (e.g., $t_{N-1}$), and/or various other terms of the instrument.

In an example embodiment, the request is automatically generated by the system computing device 10 (e.g., in response to a set and/or programmed trigger). In various embodiments, the request is generated and provided by a user computing device 20 in response to user interaction with an interactive user interface (IUI) provided via the input-output circuitry 28 of the user computing device 20. For example, the user computing device 20 may provide a callable instrument pricing request IUI 600, an example version of which is provided in FIG. 6. For example, the user computing device 20 may execute application program code to provide the callable instrument pricing request IUI 600. In various embodiments, the application program code corresponds to a dedicated application; a browser used to access a portal, website, dashboard and/or the like (e.g., provided and/or hosted by the system computing device 10 and/or the like); or other application. In various embodiments, the callable instrument pricing request IUI 600 comprises one or more fillable and/or selectable instrument information/data fields 602. For example, the user may provide input (e.g., via input-output circuitry 28) to cause one or more fillable and/or selectable instrument information/data fields 602 to be populated by the user computing device 20. The user may then select (e.g., via input-output circuitry 28) the a selectable submit element 604 (e.g., a submit button, icon, and/or the like) to cause the user computing device 20 to generate the request for callable instrument pricing and provide (e.g., transmit) the request for callable instrument pricing such that the system computing device 10 receives the request for callable instrument pricing. For example, the user computing device 20 may comprise means, such as processor 22, memory 24, communications interface 26, input-output circuitry 28, and/or the like, for receiving user input (e.g., via a callable instrument pricing request IUI 600), generate a request for callable instrument pricing, and provide the request for callable instrument pricing.

At block 504, a set of dates $\{t_i\}_{0 \leq i \leq N-1}$ are defined. The set of dates include the exercise dates for the callable instrument to be priced (e.g., based on information/data contained in the request for callable instrument pricing) and/or index reset dates. For example, the system computing device 10 may define the set of dates. In various embodiments, the set of dates are a time-ordered set (e.g., the earliest date is the first date of the set of dates and the latest date is the final date of the set of dates). For example, $t_0 < t_1 < \ldots < t_{N-2} < t_{N-1}$, for each date in the set of dates. For example, the system computing device 10 may comprise means, such as processor 12, memory 14, solver circuitry 202, and/or the like, for defining the set of dates. In an example embodiment, the set of dates are defined by the backward DNN solver (e.g., a portion of and/or executable computer code exterior to the DNN of the backward DNN solver).

At block 506, a set of index values (e.g., $\{L(t_i)_{0 \leq i \leq m}\}$) may be determined. For example, in the above example, the Libor rate path $\{L(t_i)_{0 \leq i \leq m}\}$ and the Brownian motion path $\{W(t_i)_{0 \leq i \leq m}\}$ for a plurality (e.g., M+1) paths are determined. For example, the inputs to the DNN of the backward DNN solver may be determined (e.g., possibly by a portion of and/or executable computer code the backward DNN solver that is exterior to the DNN itself). For example, the system computing device 10 may determine a set of index values and/or other inputs of the DNN of the backward DNN solver. For example, the system computing device 10 may comprise means, such as processor 12, memory 14, solver circuitry 202, and/or the like, for determining a set of index values and/or other inputs of the DNN of the backward DNN solver. In various embodiments, the set of index values and/or other inputs of the DNN of the backward DNN solver may be determined, at least in part based on information/data provided in the callable instrument pricing request. In various embodiments, the set of index values and/or other inputs of the DNN of the backward DNN solver may define a plurality of paths. In an example embodiment, each of the plurality of paths (and/or at least some of the plurality of paths) are Monte Carlo paths. In various embodiments, M+1 paths are determined, where M+1 is in the range of 2,000 to 5,000. In various embodiments, M+1 is larger than 5,000 or smaller than 2,000, as appropriate for the application. For each path, a final discounted payoff may be determined based on the final index rate and the payoff function of the callable instrument (e.g., $u(t_{N-1}, L(t_{N-1})) = g(L(T_{N-1}))$).

At block 508, the DNN of the backward DNN solver is used to iterate the final discounted payoff, back through the intermediate discounted payoffs, back to the initial discounted payoff, for each of the plurality of paths. In various embodiments, the determination of each of the discounted payoffs $u(t_i, L(t_i))$ are determined through a single iteration of the DNN. For example, the system computing device 20 may determine initial discounted payoff $u(t_0, L(t_0))$ and the intermediate discounted payoffs $\{u(t_i, L(t_i))\}_{0 < i < N-1}$ for each path by iterating backwards in time from the corresponding final discounted payoff of the callable instrument $u(t_{N-1}, L(t_{N-1}))$. For example, the system computing device 20 may comprise means, such as processor 12, memory 14, solver circuitry 202, DNN circuitry 204, and/or the like, for determining initial discounted payoff $u(t_0, L(t_0))$ and the intermediate discounted payoffs $\{u(t_i, L(t_i))\}_{0 < i < N-1}$ for each path by iterating backwards in time from the corresponding final discounted payoff of the callable instrument $u(t_{N-1}, L(t_{N-1}))$. For example, a set of initial discounted payoffs $\{u(t_0, L(t_0))\}_{0 \le \alpha \le M}$ (e.g., including an initial discounted payoff for each of the plurality (e.g., M+1) of paths) may be generated.

At block 510, it is determined if convergence requirement is satisfied. For example, the system computing device 10 may determine if the convergence requirement is satisfied. For example, the system computing device 10 may comprise means, such as processor 12, memory 14, solver circuitry 202, DNN circuitry 204, and/or the like, for determining if the convergence requirement is satisfied. In an example embodiment, the convergence requirement is a defined maximum number of iterations. In an example embodiment, the convergence requirement is a spread threshold requirement corresponding to a statistical measure of spread (e.g., variance, standard deviation, and/or the like) of the set of initial discounted payoffs. For example, the spread threshold requirement may be satisfied when the statistical measure of spread of the set of initial discounted payoffs is smaller than a spread threshold. For example, a statistical measure of spread of the initial set of discounted payoffs may be determined and compared to a spread threshold to determine if the spread threshold requirement (and thus the convergence requirement) is satisfied.

When, at block 510, it is determined that the convergence requirement is not satisfied, the process continues to block 512. At block 512, the weights and/or parameters $\theta_i$ of the backward DNN solver are modified, adjusted, refined, and/or the like. For example, a loss function may be determined (e.g., based on the set of initial discounted payoffs and/or statistical measure of spread of the initial set of discounted payoffs) and the loss function may be used to modify, adjust, refine, and/or the like the weights and/or parameters Oi of the backward DNN solver. For example, in an example embodiment, a stochastic gradient descent algorithm may be used to modify, adjust, refine, and/or the like the weights and/or parameters Oi of the backward DNN solver to minimize the loss function (and/or the measure of spread of the set of initial discounted payoffs). For example, the system computing device 10 may modify, adjust, refine, and/or the like the weights and/or parameters $\theta_i$ of the backward DNN solver. For example, the system computing device 10 may comprise means, such as processor 12, memory 14, solver circuitry 202, DNN circuitry 204, and/or the like, for modifying, adjusting, refining, and/or the like the weights and/or parameters Oi of the backward DNN solver.

When, at block 510, it is determined that the convergence requirement is satisfied, the process continues to block 514. At block 514, the callable instrument pricing information/data is determined (e.g., based on the output of the DNN of the backward DNN solver). For example, the system computing device 10 may determine the callable instrument pricing information/data. For example, the system computing device 10 may comprise means, such as processor 12, memory 14, solver circuitry 202, DNN circuitry 204, and/or the like, for determining the callable instrument pricing information/data. For example, the initial discounted option price is set as $$\overline{u(t_o, L(t_0))} = \frac{1}{M+1} \sum_{\alpha=0}^{M} u_\alpha(t_0, L(t_0)).$$

In various embodiments, the callable instrument pricing information/data may include the initial discounted option price, the value of the callable instrument at one or more exercise dates, and/or the like. In various embodiments, the value of the callable instrument at an exercise date is the average (e.g., mean) of the value of the callable instrument at the exercise date for each of the plurality of paths. The callable instrument pricing information/data is then provided such that the user computing entity 20 receives the callable instrument pricing information/data. For example, the system computing device 10 may provide the callable instrument pricing information/data such that the user computing entity 20 receives the callable instrument pricing information/data. For example, the system computing device 10 may comprise means, such as processor 12, memory 14, communications interface 16, and/or the like, for providing the callable instrument pricing information/data such that the user computing entity 20 receives the callable instrument pricing information/data.

Figure 7:
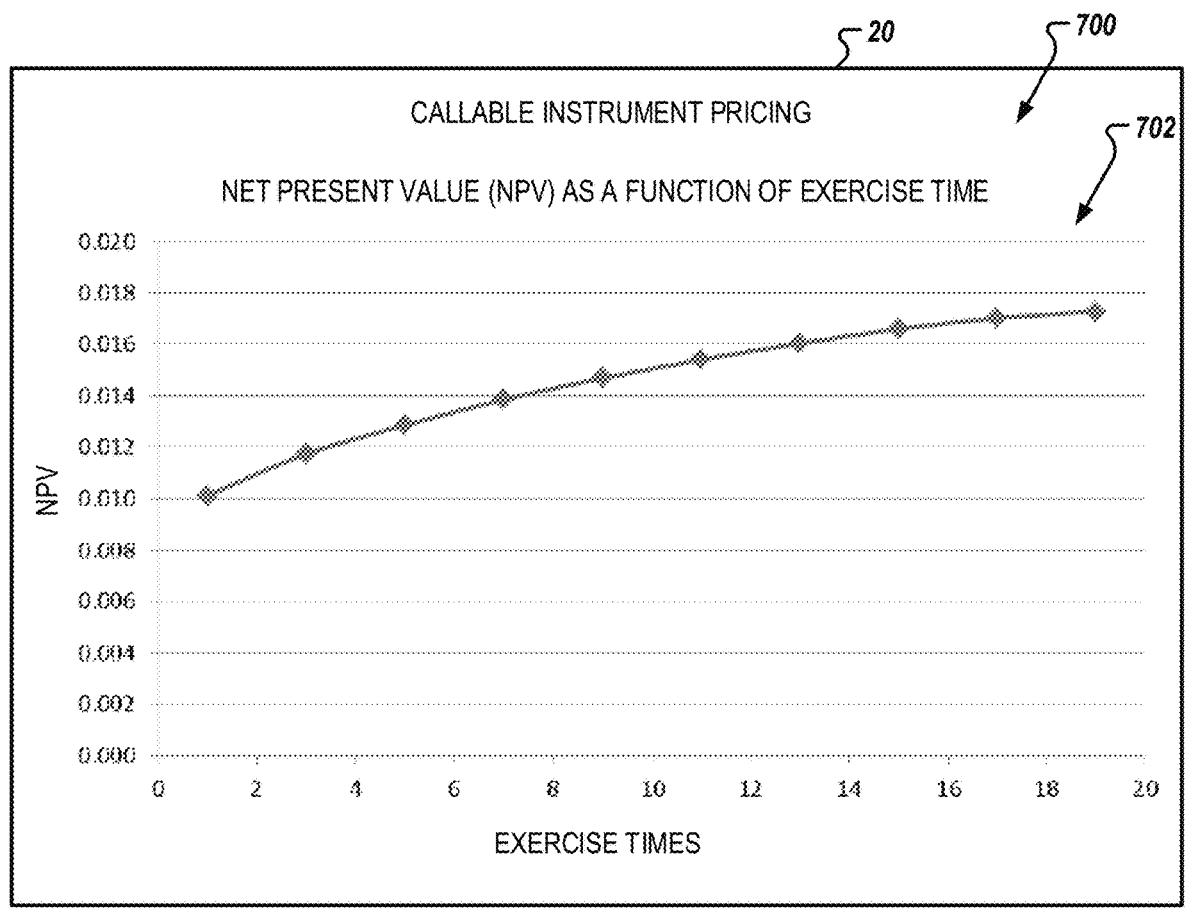
FIG. 7 illustrates an example IUI providing callable options values, according to an example embodiment described herein.

In various embodiments, the user computing device 20 receives the callable instrument pricing information/data. For example, the user computing device 20 may comprise means, such as processor 22, memory 24, communications interface 26, and/or the like for receiving the callable instrument pricing information/data. The user computing device 20 may register and/or processes the callable instrument pricing information/data (e.g., via processor 22) and generate and/or render a representation of at least a portion of the callable instrument pricing information/data. For example, a graphical and/or tabular representation of at least a portion of the callable instrument pricing information/data may be generated and/or rendered. The representation of the at least a portion of the callable instrument information/data may then be provided (e.g., displayed) via the input-output circuitry 28 of the user computing device 20. For example, the user computing device 20 may execute application program code to provide a callable instrument pricing IUI 700 via the input-output circuitry 28, an example version of which is shown in FIG. 7. In various embodiments, the application program code corresponds to a dedicated application; a browser used to access a portal, website, dashboard and/or the like (e.g., provided and/or hosted by the system computing device 10 and/or the like); or other application. As shown in FIG. 7, a callable instrument pricing IUI 700 may comprise a representation 702 of at least a portion of the callable instrument information/data. For example, the representation 702 provides a graph of net present value (e.g., initial discounted option price, value of the callable instrument at an exercise date, hold value of the instrument, and/or the like) with respect to exercise time.

In various embodiments, a human or machine user of a user computing device 20 may use at least a portion of the callable instrument pricing information/data to make one or more decisions. For example, the human or machine user may choose to exercise an option corresponding to the callable instrument or to purchase or provide the callable instrument based on the at least a portion of the callable instrument pricing information/data and/or representation thereof. In an example embodiment, the decisions may need to be made on a relatively short time frame (e.g., less than five minutes, less than fifteen minutes, less than half an hour, and/or the like). In various embodiments, the callable instrument pricing information/data is generated and provided in real time or near real time, by the system computing device 10, with respect to the receiving of the request for callable instrument pricing, by the system computing device 10.

In an example embodiment, the user is a model validation machine user that is a model validation module, application, program, and/or the like configured to compare at least a portion of the callable instrument pricing information/data to model determined callable instrument information/data to validate a callable instrument model and/or the model determined callable instrument information/data. For example, a callable instrument model that is external to the backward DNN solver may generate model determined callable instrument information/data that corresponds to the callable instrument pricing information/data. For example, the model determined callable instrument information/data may include the initial discounted option price, the value of the callable instrument at one or more exercise dates, and/or the like for the same, substantially the same, and/or similar callable instrument as the callable instrument pricing information/data determined by the backward DNN solver. The callable instrument model may be part of a line-of-business (LOB) program package or may be another callable instrument model that is otherwise separate from the backward DNN solver. In an example embodiment, the model validation machine user may comprise computer executable program code operating on the system computing device 10, a user computing device 20, and/or the like.

The model validation machine user compares one or more elements of the model determined callable instrument information/data and the callable instrument pricing information/data to determine if the model determined callable instrument information/data and the callable instrument pricing information/data satisfy a similarity requirement. In an example embodiment, if the ratio of initial discounted option price, for example, of the model determined callable instrument information/data to the initial discounted option price of the callable instrument pricing information/data is within a defined range (e.g., 0.8 to 1.25, 0.85 to 1.17, 0.9 to 1.11, 0.95 to 1.05, 0.98 to 1.02, 0.99 to 1.01, and/or the like), it may be determined that the model determined callable instrument information/data and the callable instrument pricing information/data satisfy the similarity requirement. Similarly, if the ratio of the initial discounted option price of the model determined callable instrument information/data to the initial discounted option price of the callable instrument pricing information/data is not within the defined range, the model validation machine user may determine that the similarity requirement is not satisfied. In an example embodiment, if the absolute value of the difference between the initial discounted option price, for example, of the model determined callable instrument information/data and the initial discounted option priced of the callable instrument pricing information/data or the absolute value of the difference between the initial discounted option price of the model determined callable instrument information/data and the initial discounted option price of the callable instrument pricing information/data divided by some value (e.g., the initial discounted option price of the model determined callable instrument information/data or the callable instrument pricing information/data) is less than a threshold value, it may be determined that the similarity requirement is satisfied. Similarly, if the absolute value of the difference between the initial discounted option price, for example, of the model determined callable instrument information/data and the initial discounted option priced of the callable instrument pricing information/data or the absolute value of the difference between the initial discounted option price of the model determined callable instrument information/data and the initial discounted option price of the callable instrument pricing information/data divided by some value (e.g., the initial discounted option price of the model determined callable instrument information/data or the callable instrument pricing information/data) is not less than the threshold value, the model validation machine user may determine that the similarity requirement is not satisfied.

When the similarity requirement is satisfied, the model validation machine user may cause the callable instrument information/data to be stored, a log to be updated indicating that the similarity requirement was satisfied, and/or the like. When the similarity requirement is not satisfied, the model validation machine user may cause the callable instrument information/data to be stored, a log to be updated indicating that the similarity requirement was not satisfied, generate and cause an alert to be provided (e.g., via the IUI of the user computing device 20, via an email, instant message, and/or the like), and/or otherwise provide feedback to one or more human users or other machine users that the similarity requirement was not satisfied. In an example embodiment, providing the alert includes causes a representation of the at least a portion of the callable instrument information/data to be provided (e.g., displayed) via the input-output circuitry 28 of the user computing device 20, a representation of at least a portion of the model determined callable instrument information/data to be provided (e.g., displayed) via the input-output circuitry 28 of the user computing device 20, an identification of the callable instrument model that did not satisfy the similarity requirement, information/data identifying the callable model for which the callable instrument model that did not satisfy the similarity requirement, an indication that the similarity requirement was not satisfied, and/or the like, and/or various combinations thereof.

FIG. 5 illustrates a flowchart describing sets of operations performed by apparatuses, methods, and computer program products according to various example embodiments. It will be understood that each block of the flowcharts, and combinations of blocks in the flowcharts, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computer or other programmable apparatus (e.g., hardware) to produce a machine, such that the resulting computer or other programmable apparatus implements the functions specified in the flowchart blocks. These software instructions may also be stored in a computer-readable memory that may direct a computer or other programmable apparatus to function in a particular manner, such that the software instructions stored in the computer-readable memory produce an article of manufacture, the execution of which implements the functions specified in the flowchart blocks. The software instructions may also be loaded onto a computer or other programmable apparatus to cause a series of operations to be performed on the computer or other programmable apparatus to produce a computer-implemented process such that the software instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Technical Advantages

As these examples illustrate, example embodiments contemplated herein provide technical solutions that solve real-world problems faced during the pricing of callable instruments and the pricing of callable instruments having multiple exercise dates, in particular. Traditional means for pricing callable instruments, such as numerical methods, are not able to handle the high dimensional nature of pricing callable instruments having multiple exercise dates. Monte Carlo methods for pricing callable instruments require an exponentially growing number of paths to evaluate the expected future value of a callable instrument. For example, Monte Carlo methods generally require evaluating more than a factor of ten more paths than the number of paths used by embodiments of the backward DNN solver. For example, an embodiment of the backward DNN solver uses 4,096 paths while, to solve the same problem, Monte Carlo methods require 50,000 paths. As such, Monte Carlo methods for pricing callable instruments are computationally expensive and inefficient. Various embodiments of the backward DNN solver therefore provide an improvement in the art and a technical improvement of increased computational efficiency compared to techniques known in the art for pricing callable instruments and callable instruments with multiple exercise dates in particular.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for determining an initial value of a time series, the method comprising:
 defining a plurality of paths corresponding to a time-ordered set of times;
 training a deep neural network (DNN) of a backward DNN solver for a plurality of iterations until a convergence requirement is satisfied by:
  for each path of the plurality of paths, using the backward DNN solver, determining a time series value for each time of the time-ordered set of times, wherein for each path, (a) a final time series value, corresponding to a final time $t_N$ of the time-ordered set of times, is determined, (b) intermediate values, corresponding to times of the time-ordered set of time between an initial time and the final time, are determined in reverse time order, and (c) an initial value, corresponding to the initial time $t_0$ of the time-ordered set of times, is determined, wherein an $i^{th}$ time series value corresponding to a time $t_i$ of the time-ordered set of times is determined based on an $(i+1)^{th}$ intermediate time series value corresponding to a time wherein the time-ordered set of times is ordered such that $t_0 < t_i < t_{i+1} < t_N$,
  defining a set of initial values comprising the initial value determined for each path and determining one or more statistical measures of spread based on the set of initial values, and
  modifying one or more parameters of the DNN based on the one or more statistical measures of spread;
 after the convergence requirement is satisfied, defining an initial time series value based on the set of initial values determined on a final iteration of the plurality of iterations; and
 providing the initial time series value such that at least one of (a) a user computing device receives the at least a portion of the pricing information and provides a representation of the at least a portion of the pricing information via an interactive user interface provided via a display of the user computing device or (b) the initial time series value is provided to a machine user.

2. The method of claim 1, wherein the convergence requirement is at least one of (a) a set number of iterations performed or (b) at least one of the one or more statistical measures of spread satisfies a spread threshold requirement.

3. The method of claim 1, wherein the initial time series value is an initial discounted option price of a callable instrument.

4. The method of claim 1, wherein the DNN of the backward DNN solver determines a gradient of a time series value with respect to a respective index path used to define a path of the plurality of paths.

5. The method of claim 1, wherein the one or more parameters of the DNN are modified using a stochastic gradient descent training model.

6. The method of claim 1, wherein the DNN comprises a plurality of sub-networks, each sub-network corresponding to a respective time of the time-ordered set of dates.

7. The method of claim 1, wherein each path of the plurality of paths is defined by a respective index value path and a respective Brownian motion path.

8. The method of claim 1, wherein the machine user is a model validation program.

9. The method of claim 1, wherein the DNN is a feed-forward DNN.

10. An apparatus for pricing a callable instrument, the apparatus comprising:
 at least one processor configured to:
 define a plurality of paths corresponding to a time-ordered set of times;
 train a deep neural network (DNN) of a backward DNN solver for a plurality of iterations until a convergence requirement is satisfied by:

for each path of the plurality of paths, using the backward DNN solver, determining a time series value for each time of the time-ordered set of times, wherein for each path, (a) a final time series value, corresponding to a final time $t_N$ of the time-ordered set of times, is determined, (b) intermediate values, corresponding to times of the time-ordered set of time between an initial time and the final time, are determined in reverse time order, and (c) an initial value, corresponding to the initial time to of the time-ordered set of times, is determined, wherein an $i^{th}$ time series value corresponding to a time $t_i$ of the time-ordered set of times is determined based on an $(i+1)^{th}$ intermediate time series value corresponding to a time wherein the time-ordered set of times is ordered such that $t_0 < t_i < t_{i+1} < t_N$, defining a set of initial values comprising the initial value determined for each path and determining one or more statistical measures of spread based on the set of initial values, and modifying one or more parameters of the DNN based on the one or more statistical measures of spread;

after the convergence requirement is satisfied, define an initial time series value based on the set of initial values determined on a final iteration of the plurality of iterations; and provide the initial time series value such that at least one of (a) a user computing device receives the at least a portion of the pricing information and provides a representation of the at least a portion of the pricing information via an interactive user interface provided via a display of the user computing device or (b) the initial time series value is provided to a machine user.

11. The apparatus of claim 10, wherein the convergence requirement is at least one of (a) a set number of iterations performed or (b) at least one of the one or more statistical measures of spread satisfies a spread threshold requirement.

12. The apparatus of claim 10, wherein the initial time series value is an initial discounted option price of a callable instrument.

13. The apparatus of claim 10, wherein the DNN of the backward DNN solver determines a gradient of a time series value with respect to a respective index path used to define a path of the plurality of paths.

14. The apparatus of claim 10, wherein the one or more parameters of the DNN are modified using a stochastic gradient descent training model.

15. The apparatus of claim 10, wherein the DNN comprises a plurality of sub-networks, each sub-network corresponding to a respective time of the time-ordered set of dates.

16. The apparatus of claim 10, wherein each path of the plurality of paths is defined by a respective index value path and a respective Brownian motion path.

17. The apparatus of claim 10, wherein the machine user is a model validation program.

18. The apparatus of claim 10, wherein the DNN is a feedforward DNN.

19. A computer program product comprising a non-transitory computer-readable storage medium storing computer-readable instructions, wherein the computer-readable instructions are configured to, when executed by a processor of an apparatus, cause the apparatus to:

define a plurality of paths corresponding to a time-ordered set of times;

train a deep neural network (DNN) of a backward DNN solver for a plurality of iterations until a convergence requirement is satisfied by:

for each path of the plurality of paths, using the backward DNN solver, determining a time series value for each time of the time-ordered set of times, wherein for each path, (a) a final time series value, corresponding to a final time $t_N$ of the time-ordered set of times, is determined, (b) intermediate values, corresponding to times of the time-ordered set of time between an initial time and the final time, are determined in reverse time order, and (c) an initial value, corresponding to the initial time to of the time-ordered set of times, is determined, wherein an $i^{th}$ time series value corresponding to a time $t_i$ of the time-ordered set of times is determined based on an $(i+1)^{th}$ intermediate time series value corresponding to a time $t_{i+1}$, wherein the time-ordered set of times is ordered such that $t_0 < t_i < t_{i+1} < t_N$, defining a set of initial values comprising the initial value determined for each path and determining one or more statistical measures of spread based on the set of initial values, and modifying one or more parameters of the DNN based on the one or more statistical measures of spread;

after the convergence requirement is satisfied, define an initial time series value based on the set of initial values determined on a final iteration of the plurality of iterations; and provide the initial time series value such that at least one of (a) a user computing device receives the at least a portion of the pricing information and provides a representation of the at least a portion of the pricing information via an interactive user interface provided via a display of the user computing device or (b) the initial time series value is provided to a machine user.

20. The computer program product of claim 19, wherein the convergence requirement is at least one of (a) a set number of iterations performed or (b) at least one of the one or more statistical measures of spread satisfies a spread threshold requirement and the one or more parameters of the DNN are modified using a stochastic gradient descent training model.

* * * * *